US008056414B2

(12) United States Patent
Noguchi et al.

(10) Patent No.: US 8,056,414 B2
(45) Date of Patent: Nov. 15, 2011

(54) ANGULAR VELOCITY SENSOR AND ANGULAR VELOCITY SENSING DEVICE

(75) Inventors: Takao Noguchi, Tokyo (JP); Kenichi Tochi, Tokyo (JP); Ken Unno, Tokyo (JP); Tatsuo Namikawa, Tokyo (JP)

(73) Assignee: TDK Corporation, Tokyo (JP)

( * ) Notice: Subject to any disclaimer, the term of this patent is extended or adjusted under 35 U.S.C. 154(b) by 611 days.

(21) Appl. No.: 12/078,031

(22) Filed: Mar. 26, 2008

(65) Prior Publication Data

US 2008/0236281 A1 Oct. 2, 2008

(30) Foreign Application Priority Data

Mar. 30, 2007 (JP) ................................. 2007-091268

(51) Int. Cl.
*G01P 9/04* (2006.01)
*H01L 41/00* (2006.01)
(52) U.S. Cl. ...................... 73/504.16; 310/370
(58) Field of Classification Search ............... 73/504.16, 73/504.12, 504.14, 504.04; 310/370
See application file for complete search history.

(56) References Cited

U.S. PATENT DOCUMENTS

| | | | | |
|---|---|---|---|---|
| 5,396,144 A | * | 3/1995 | Gupta et al. ................... | 310/370 |
| 6,490,925 B2 | * | 12/2002 | Inoue et al. .................. | 73/504.16 |
| 6,651,498 B1 | * | 11/2003 | Kikuchi et al. ............. | 73/504.12 |
| 6,698,292 B2 | * | 3/2004 | Kikuchi ........................... | 73/662 |
| 6,701,785 B2 | * | 3/2004 | Knowles et al. ............ | 73/504.16 |
| 6,903,618 B2 | * | 6/2005 | Kawashima ................... | 331/158 |
| 7,043,986 B2 | * | 5/2006 | Kikuchi et al. .............. | 73/504.12 |
| 7,210,350 B2 | * | 5/2007 | Ogura ......................... | 73/504.12 |
| 7,216,540 B2 | * | 5/2007 | Inoue et al. ................. | 73/504.16 |
| 7,246,520 B2 | * | 7/2007 | Eguchi et al. ............... | 73/504.16 |
| 7,253,554 B2 | * | 8/2007 | Dalla Piazza et al. ........ | 310/370 |
| 7,363,815 B2 | * | 4/2008 | Ohuchi et al. .............. | 73/504.16 |

FOREIGN PATENT DOCUMENTS

| | | |
|---|---|---|
| JP | A-8-128833 | 5/1996 |
| JP | A-2003-227719 | 8/2003 |
| JP | A-2004-333460 | 11/2004 |
| JP | A-2005-106481 | 4/2005 |
| JP | B2-3694160 | 7/2005 |

* cited by examiner

*Primary Examiner* — Helen C. Kwok
(74) *Attorney, Agent, or Firm* — Oliff & Berridge, PLC

(57) ABSTRACT

An angular velocity sensor of a horizontally located type, in which influence of a translational acceleration applied thereto from a lateral direction is readily removed and a fixed portion thereof is easily fixed, is provided. It includes a fixed portion fixed to the top surface of a sensor element supporting portion of a casing, an upper detection arm portion and a lower detection arm portion respectively connected to the fixed portion on sides opposite to each other and extending along a plane parallel to the top surface of the sensor element supporting portion, and a pair of upper vibration arms connected to the fixed portion with the upper detection arm portion in between. The fixed portion includes one or more slits extending at least in a direction intersecting with the extending direction of the upper detection arm portion.

18 Claims, 35 Drawing Sheets

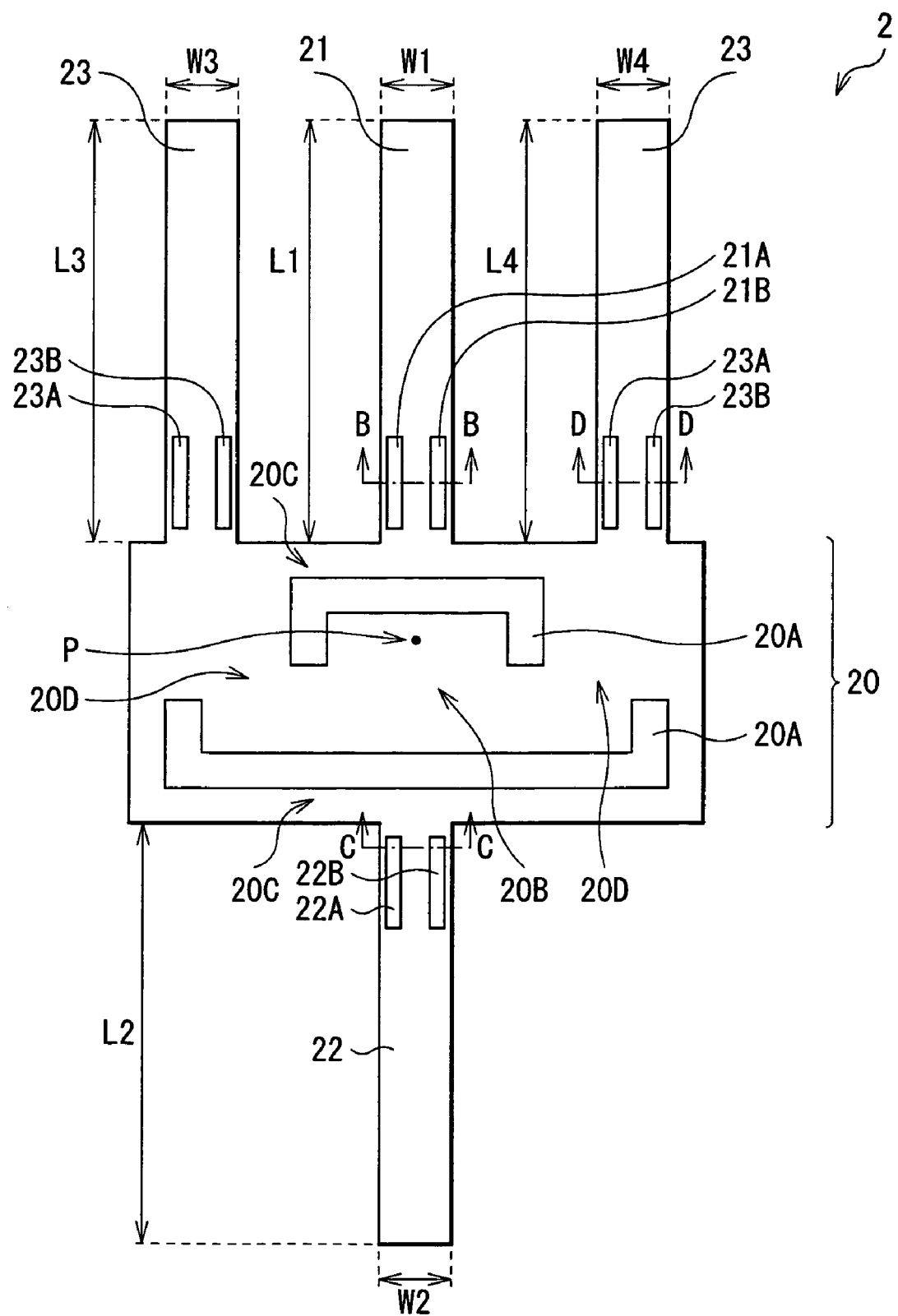
F I G. 10

ANGULAR VELOCITY SENSOR AND ANGULAR VELOCITY SENSING DEVICE

CROSS REFERENCE TO RELATED APPLICATIONS

The present invention contains subject matter related to Japanese Patent Application JP 2007-091268 filed in the Japanese Patent Office on Mar. 30, 2007, the entire contents of which being incorporated herein by reference.

BACKGROUND OF THE INVENTION

1. Field of the Invention

The present invention relates to an angular velocity sensor for detecting an angular velocity of an object and an angular velocity sensing device including the same.

2. Description of the Related Art

Although the angular velocity sensor has been used for technologies to autonomously control the position of a vessel, an aircraft, a rocket, etc. in the past, recently it is also mounted in small electronic equipments such as a car-navigation system, a digital camera, a video camera, and a cellular phone. Accordingly, more compact and lower (thin-shaped) angular velocity sensors are demanded. Thus an angular velocity sensor of a horizontally located type, of which its longitudinal direction is orthogonal to the vertical direction, has been proposed in Japanese Laid-Open Patent Publication No. 08-128833 and Japanese Laid-Open Patent Publication No. 2004-333460 and so on instead of the angular velocity sensor of the related art in which its longitudinal direction (the direction of the detection axis) is parallel to the vertical direction as proposed in Japanese Laid-Open Patent Publication No. 2003-227719.

SUMMARY OF THE INVENTION

However, in the above-mentioned arts of Japanese Laid-Open Patent Publications No. 08-128833 and No. 2004-333460, a drive arm and a detection arm are mutually connected via a fixed portion. Thus, when the fixed portion is tightly fixed onto a support surface that supports an angular velocity sensor, it becomes difficult to efficiently transmit to the detection arm a distortion generated by the Coriolis force applied on the drive arm. On the other hand, the fixed portion which is loosely fixed onto the support surface may cause an issue that not only the fixed portion but even the detection arm is shaky at the time of operating the drive arm.

The present invention has been devised in view of the above issue, and it is desirable to provide an angular velocity sensor of a horizontally located type that can efficiently transmit the distortion generated by the Coriolis force, and an angular velocity sensing device including the same.

An angular velocity sensor of an embodiment of the present invention includes a fixed portion fixed to a support surface, a detection arm portion connected to the fixed portion and extending along a plane parallel to the support surface, and a drive arm portion connected to the fixed portion and extending along the plane parallel to the support surface. Here, the fixed portion includes one or more slits or trenches extending at least in a direction intersecting with the extending direction of the detection arm portion. It is to be noted that "connected" represents a concept including such manners as being joined mechanically, being integrally formed, or being directly or indirectly connected.

An angular velocity sensing device of an embodiment of the present invention includes the above-mentioned angular velocity sensor and an integrated circuit element, and the integrated circuit element transmits driving signals to the drive arm portion and also receives detection signals outputted from the detection arm portion.

In the angular velocity sensor and the angular velocity sensing device of embodiments of the present invention, since the fixed portion includes one or more slits or trenches extending at least in a direction intersecting with the extending direction of the detection arm portion, the fixed portion can be distorted easily.

Here, the detection arm portion may include a first upper vibration arm and a first lower vibration arm respectively connected to the fixed portion on sides opposite to each other, and the drive arm portion may include a second upper vibration arm and a third upper vibration arm connected to the fixed portion on one side in such a manner as to form a pair of arms, with the first upper vibration arm in between, and respectively extending along the plane parallel to the support surface in the same direction where the first upper vibration arm extends.

Preferably, the one or more slits or trenches may be configured to pass through the fixed portion. Preferably, the one or more slits or trenches may be formed symmetrically with respect to the detection arm portion. Preferably, a center of gravity of the angular velocity sensor is located in a region of the slits or trenches. Preferably, when the one or more slits are formed symmetrically with respect to the detection arm portion, a length x and a length W satisfy the following relational expression:

$$x/W \geq 0.5$$

where the length x is a length of the slit in a direction orthogonal to the extending direction of the detection arm portion and the length W is a length of the fixed portion in the direction orthogonal to the extending direction of the detection arm portion.

Preferably, when a plurality of the slits are formed in the fixed portion to extend symmetrically with respect to the first upper vibration arm, the slits may be configured to surround a center of gravity of the angular velocity sensor. Here, the slits may be configured in the form of a straight line, an L-shape, a U-shape, or J-shape.

Preferably, connection points, where the fixed portion is connected to each of the first to third upper vibration arms, may be linearly arranged. Preferably, the first to the third upper vibration arms and the first lower vibration arm may be configured to extend in directions parallel to each other. Preferably, the second upper vibration arm and the third upper vibration arm may be formed symmetrically with respect to the first upper vibration arm.

Preferably, the angular velocity sensor may be configured to include: a pair of first upper electrodes formed on the first upper vibration arm and arranged side by side along a width direction of the first upper vibration arm, a pair of first lower electrodes formed on the first lower vibration arm and arranged side by side along the width direction of the first lower vibration arm, a pair of second upper electrodes formed on the second upper vibration arm and arranged side by side along the width direction of the second upper vibration arm, and a pair of third upper electrodes formed on the third upper vibration arm and arranged side by side along the width direction of the third upper vibration arm.

Preferably, when the angular velocity sensor includes a second lower vibration arm and a third lower vibration arm that are connected to the fixed portion on another side in such a manner as to form a pair of arms with the first lower vibration arm in between and respectively extending along the plane parallel to the support surface in the same direction where the first lower vibration arm extends, any one of the following (1) to (7) may be realized:

(1) the slits are formed symmetrically with respect to the detection arm portion;
(2) the slits are formed with respect to a symmetry axis passing through a center of the fixed portion in a direction orthogonal to the extending direction of the detection arm portion;
(3) the connection points, where the fixed portion is connected to each of the first to third lower vibration arms, are linearly arranged;
(4) the first to third upper vibration arms, and the first to third lower vibration arms are configured to extend in directions parallel to each other;
(5) the second lower vibration arm and the third lower vibration arm are formed symmetrically with respect to the first lower vibration arm;
(6) the first upper vibration arm and the first lower vibration arm are configured to extend symmetrically with respect to a symmetry axis passing through a center of the fixed portion in a direction orthogonal to the extending direction of the detection arm portion, and the second and third upper vibration arms and the second and third lower vibration arms are configured to extend symmetrically with respect to the symmetry axis, respectively;
(7) the angular velocity sensor includes: a pair of first upper electrodes formed on the first upper vibration arm and arranged side by side along a width direction of the first upper vibration arm, a pair of first lower electrodes formed on the first lower vibration arm and arranged side by side along the width direction of the first lower vibration arm, a pair of second upper electrodes formed on the second upper vibration arm and arranged side by side along the width direction of the second upper vibration arm, a pair of third upper electrodes formed on the third upper vibration arm and arranged side by side along the width direction of the third upper vibration arm, a pair of second lower electrodes formed on the second lower vibration arm and arranged side by side along the width direction of the second lower vibration arm, and a pair of third lower electrodes formed on the third lower vibration arm and arranged side by side along the width direction of the third lower vibration arm.

EFFECTS OF THE INVENTION

According to the angular velocity sensor and the angular velocity sensing device of an embodiment of the present invention, since the fixed portion includes one or more slits or trenches extending at least in a direction intersecting with the extending direction of the detection arm portion, distortion generated by the Coriolis force applied to the drive arm portion can be easily transmitted to the detection arm portion via the fixed portion.

Here, when the detection arm portions are formed by the first upper vibration arm and the first lower vibration arm respectively connected to the fixed portion on sides opposite to each other, and also the drive arm portions are formed by the second upper vibration arm and the third upper vibration arm connected to the fixed portion on one side in such a manner as to form a pair of arms with the first upper vibration arm in between and respectively extending in the extending direction of the first upper vibration arm, the first lower vibration arm is configured to extend in a direction opposite to the extending directions of the first to third upper vibration arms. Thus, even as a horizontally located type, the Coriolis-based vibration can be easily discriminated from the vibration caused by a translational acceleration applied from a lateral direction, generated in the first upper vibration arm and the first lower vibration arm. Thus the influence of the translational acceleration from the lateral direction can be easily removed. In particular, distortion generated by the Coriolis force applied to the second and third upper vibration arms is easily transmitted to the first upper vibration arm via the fixed portion.

When the slits or trenches are configured to pass through the fixed portion, the fixed portion is more easily distorted. Thus distortion generated by the Coriolis force can be transmitted more efficiently to the detection arm portions, or the first upper vibration arm and the first lower vibration arm. When the slits or trenches are formed symmetrically with respect to the detection arm portion, drive vibrations are easily generated on both sides symmetrically. As a result, the configuration of a drive circuit driving the drive arm portions or the second/third upper vibration arms can be simplified and reduce the generation of unnecessary vibrations that would be generated in the detection arm portions, or the first upper vibration arm and the first lower vibration arm.

In the case of forming in the fixed portion only one slit extending symmetrically with respect to the detection arm portion or the first upper vibration arm, when the length x of the slit and the length W of the fixed portion satisfy the above-mentioned relational expression, the value of the detected voltage increases, thus angular velocity sensor characteristics, such as sensitivity, detecting accuracy, and resolution improve.

When the connection points connecting the fixed portion to each of the first to third upper vibration arms are linearly arranged, the first to third upper vibration arms can be configured almost in the same form. Thus adjustment of frequency becomes simplified. Further, configuration processing at the time of manufacture becomes more simple to suppress an occurrence of dispersion in the configuration of each angular velocity sensor. Thus components of uniform characteristics are easily available. In addition, when the first to third upper vibration arms and the first lower vibration arm are configured to extend in directions parallel to each other, the greatest moment is obtainable from the Coriolis force. Thus the detecting accuracy is improved. When the second upper vibration arm and the third upper vibration arm are formed symmetrically with respect to the first upper vibration arm, drive vibrations are easily generated on both sides symmetrically. As a result, the configuration of the drive circuit driving the second/third upper vibration arms can be simplified and reduce the generation of unnecessary vibrations that would be generated in the first upper vibration arm and the first lower vibration arm.

When the slits or trenches are configured to include the center of gravity, or configured to surround the center of gravity, or configured in the form of an L-shape, a U-shape, or a J-shape, distortion generated by the Coriolis force applied to the drive arm portion, i.e., or the second/third upper vibration arms can be transmitted more easily via the fixed portion to the detection arm portion, i.e., or the first upper vibration arm and the first lower vibration arm.

When the second lower vibration arm and the third lower vibration arm are provided, which are respectively connected to the fixed portion on another side in such a manner as to form a pair of arms with the first lower vibration arm in between and which extend in directions parallel to the first lower vibration arm, the generated Coriolis force can be applied as a greater moment to the second and third upper vibration arms and the second and third lower vibration arms, thus comparatively increasing the amplitude of vibrations of both of the first upper vibration arm and the first lower vibration arm. As a result, that will improve the detecting accuracy of the angular velocity.

In the case of providing the second and third lower vibration arms, when the slits or trenches are formed symmetrically with respect to the detection arm portion and also formed symmetrically with respect to a symmetry axis passing through the center of the fixed portion and extending in a direction orthogonal to the extending direction of the first upper vibration arm, drive vibrations are easily generated on both sides symmetrically. As a result, the configuration of the drive circuit driving the second/third upper vibration arms and the second/third lower vibration arms can be simplified and reduce the generation of unnecessary vibrations that would be generated in the second/third upper vibration arms and the second/third lower vibration arms.

When the connection points connecting the fixed portion to each of the first to third lower vibration arms are linearly arranged, the first to third lower vibration arms can be configured almost in the same form. Thus adjustment of frequency becomes simplified. Further, configuration processing at the time of manufacture becomes more simple to suppress an occurrence of dispersion in the configuration of each angular velocity sensor. Thus components of uniform characteristics are easily available. When the first to third upper vibration arms and the first to third lower vibration arms are configured to extend in directions parallel to each other, the greatest moment is obtainable from the Coriolis force. Thus detecting accuracy of the angular velocity improves still more.

In addition, when the first upper vibration arm and the first lower vibration arm are configured to extend symmetrically with respect to a symmetry axis passing through the center of the fixed portion and extending in a direction orthogonal to extending direction of the detection arm portion, and the second and third upper vibration arms and the second and third lower vibration arms are configured to extend symmetrically with respect to a symmetry axis, respectively, the vibration caused by the translational acceleration can be easily discriminated from the angular velocity-based vibration. Thus detecting accuracy of the angular velocity is improved.

Other and further objects, features and advantages of the invention will appear more fully from the following description.

BRIEF DESCRIPTION OF THE DRAWINGS

FIG. 10 is a top surface block diagram of an angular velocity sensor according to still another modification of FIG. 3.

DESCRIPTION OF THE PREFERRED EMBODIMENTS

Embodiments of the present invention will be described in detail hereinbelow with reference to the drawings.

First Embodiment

Figure 1:
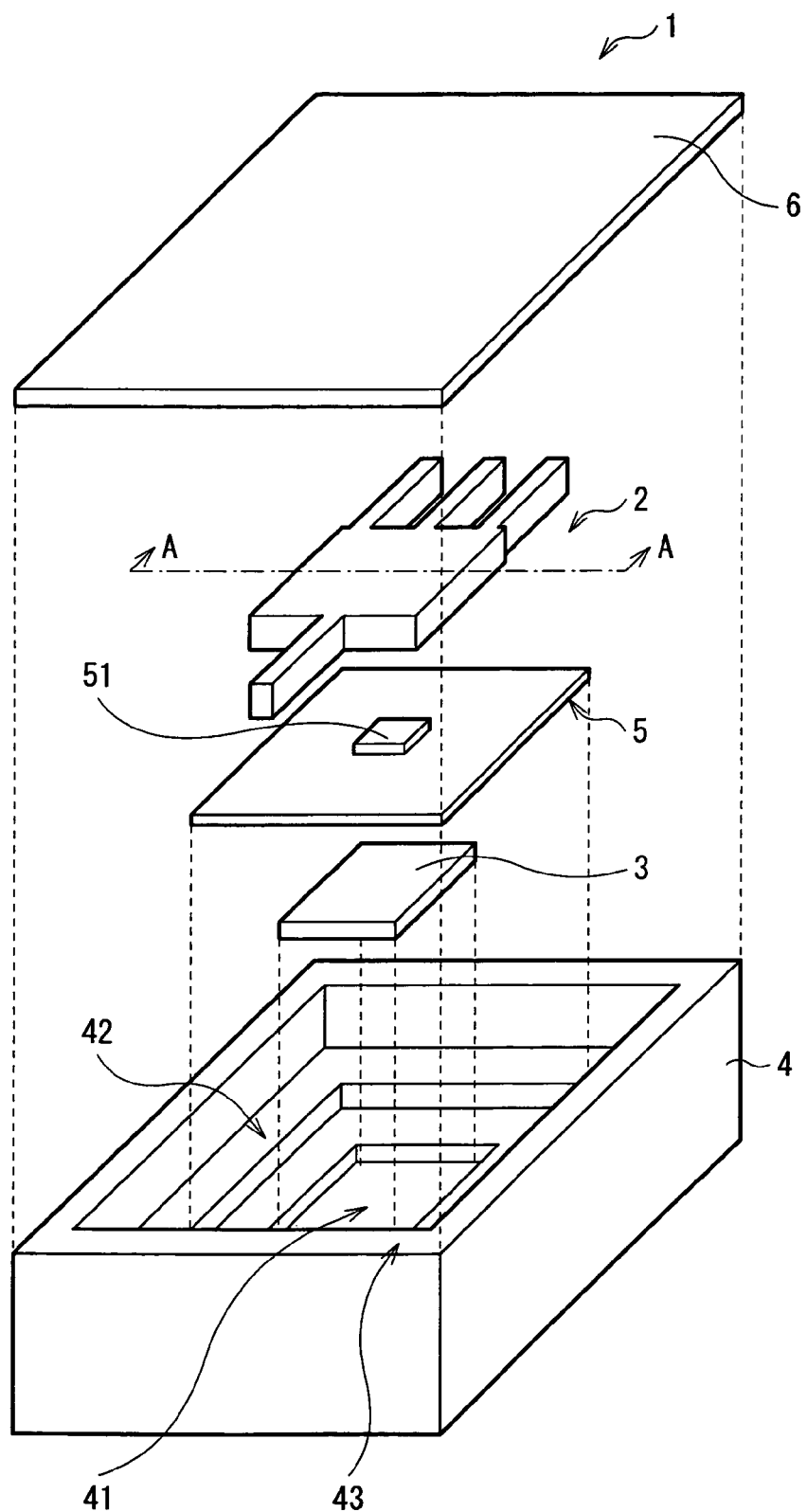
FIG. 1 is a perspective view showing a disassembled internal configuration of an angular velocity sensing device according to a first embodiment of the present invention.
Figure 2:
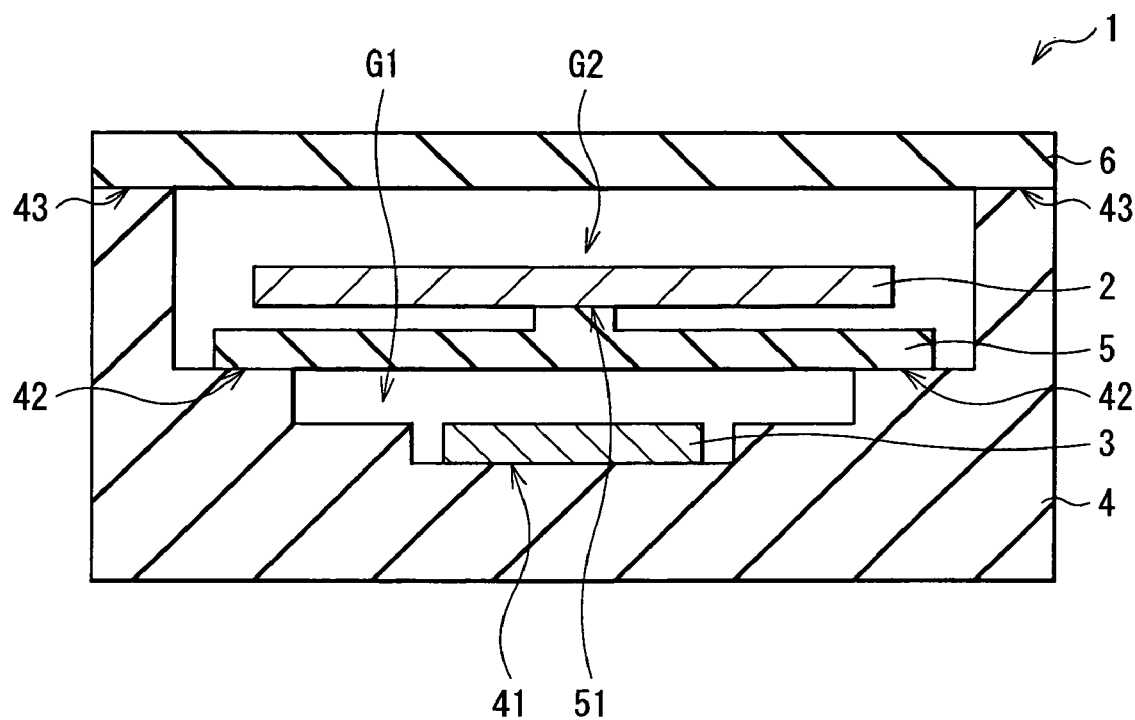
FIG. 2 is a cross sectional view showing a configuration taken along line A-A of FIG. 1, as seen from the direction indicated by the arrows.

Configuration of an angular velocity sensing device 1 according to a first embodiment of the present invention will be described hereinbelow. FIG. 1 is a perspective view showing a disassembled internal configuration of the angular velocity sensing device 1 according to the embodiment. FIG. 2 is a sectional view showing a cross-sectional configuration of the angular velocity sensing device 1 taken along line A-A thereof, as seen from the direction indicated by the arrows.

The angular velocity sensing device 1 includes, for example, an integrated circuit element 3 disposed in an internal space G1 (refer to FIG. 2) formed by being surrounded by a casing 4 and an inner-cover section 5, both of which being fit into each other. The angular velocity sensing device 1 further includes, for example, an angular velocity sensor 2 disposed in an internal space G2 (refer to FIG. 2) formed by being surrounded by the casing 4 and a top-cover section 6, both of which being fit into each other.

The integrated circuit element 3 transmits driving signals to each piezoelectric element provided in each drive arm portion of the angular velocity sensor 2 and also receives detection signals outputted from each piezoelectric element provided in each detection arm portion of the angular velocity sensor 2, as described later. The casing 4 is formed typically by stacking a plurality of ceramic thin plates so as to have step-like depressions therein having a plurality of layers, so that it can house both of the angular velocity sensor 2 and the integrated circuit element 3 in each of the layers. The inner-cover section 5 and the top-cover section 6 are typically formed of the same ceramic material as that of the casing 4.

As shown in FIG. 1, an integrated circuit supporting portion 41 of a rectangular shape is formed in the deepest layer of the depressions in the casing 4, and the integrated circuit element 3 is disposed thereon. An inner-cover section supporting portion 42 of an rectangular shape is formed in the periphery of the integrated circuit supporting portion 41, in a layer shallower (upper) than that of the integrated circuit supporting portion 41, and the inner-cover section 5 is disposed on the inner-cover section supporting portion 42 like a simple beam supported at both ends. A sensor element supporting portion 51 (support surface) is formed in the center of the inner-cover section 5, and the angular velocity sensor 2 is arranged on the sensor element supporting portion 51. In addition, a top-cover section supporting portion 43 of an rectangular shape, which is an outer edge of the whole cavity, is formed around in the periphery of the inner-cover section supporting portion 42. The top-cover section supporting portion 43 and the top-cover section 6 are fit into each other to seal the depressions in the casing 4 from the outside, thereby forming the internal space G2 (refer to FIG. 2).

The angular velocity sensor 2 is formed along a plane parallel to a top surface of the sensor element supporting portion 51 provided on the inner-cover section 5, as shown in FIGS. 1 and 2. That is, the angular velocity sensor 2 herein has a configuration of what is called a horizontally located type.

Figure 3:
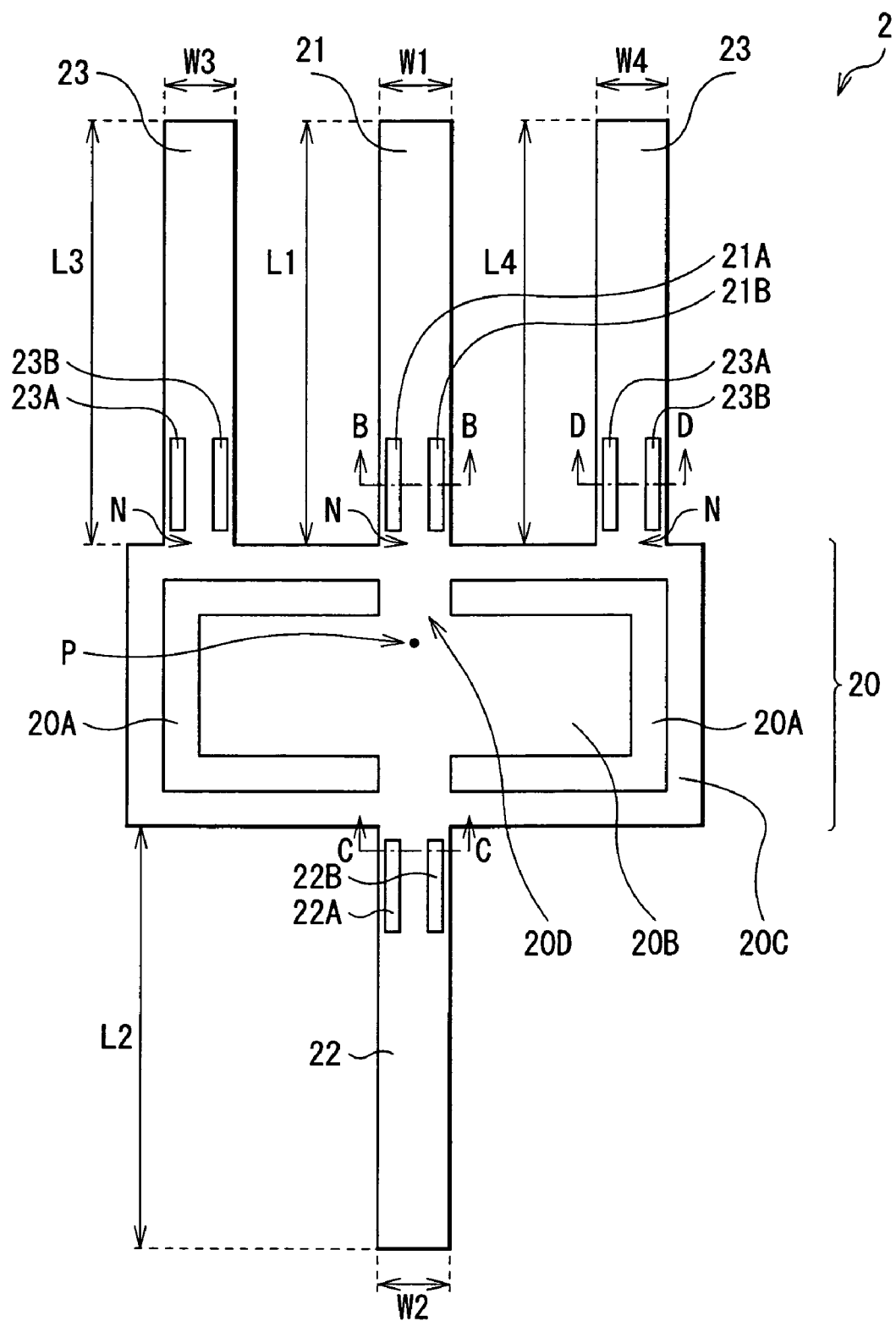
FIG. 3 is a top surface block diagram of an angular velocity sensor of FIG. 1.
Figure 4:
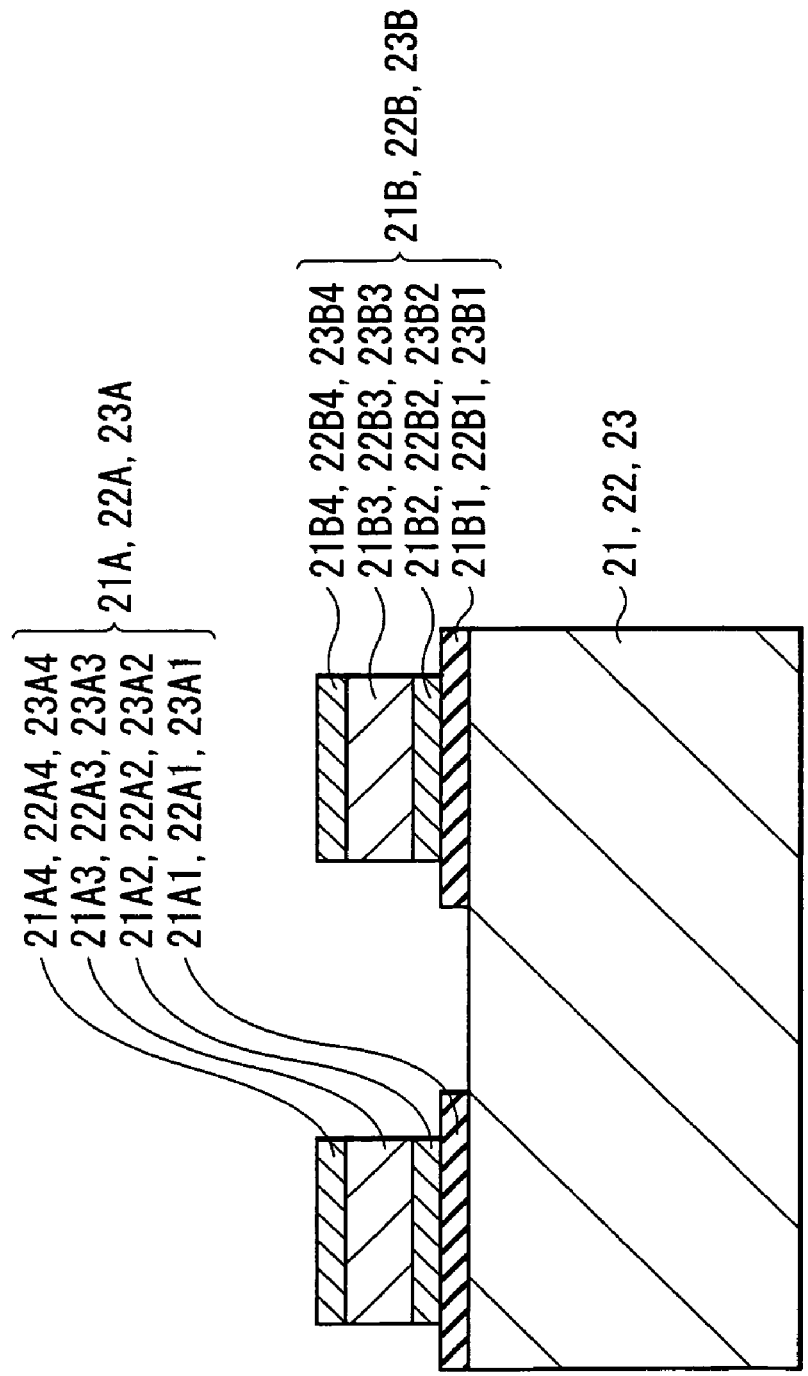
FIG. 4 is a cross sectional view collectively showing a configuration taken along lines B-B, C-C and D-D of the angular velocity sensor of FIG. 3, as seen from the directions indicated by the arrows.

FIG. 3 is a plan view showing an example of top surface configuration of the angular velocity sensor 2, and FIG. 4 is a sectional view collectively showing examples of the cross-sectional configurations taken along lines B-B, C-C and D-D of FIG. 3 seen from the directions indicated by the arrows. The angular velocity sensor 2 includes a fixed portion 20 that is fixed to the sensor element supporting portion 51, an upper detection arm portion 21 (a first upper vibration arm) and a lower detection arm portion 22 (a first lower vibration arm) respectively connected to the both sides of the fixed portion 20 (upper side and lower side thereof as viewed in a plan view of FIG. 3), and a pair of upper drive arm portions 23 (a second upper vibration arm and a third upper vibration arm) respectively connected to the fixed portion 20 in such a manner as to form a pair of arms with the upper detection arm portion 21 in between.

Here, the word "upper", which is included in each of the names "upper detection arm portion 21" and "upper drive arm portions 23" indicates an upper portion with respect to a symmetry axis passing through the center of the fixed portion 20, as viewed in a plan view of FIG. 3. That is used just for convenience, and never meaning any height directions. Similarly, the word "lower", which is included in the name "lower detection arm portion 22" indicates a lower portion with respect to the symmetry axis passing through the center of the fixed portion 20, as viewed in a plan view of FIG. 3. That is used just for convenience, and never meaning any height directions.

As well, it is to be noted that "right-left symmetry", "up-down symmetry", and "up-down and right-left symmetry" hereinbelow are used just for convenience in order to define directions of symmetry as viewed in a plan view of figures. In the present specification, "right-left" represents a direction orthogonal to the extending direction of an upper detection arm portion 21, and "up-down" represents an extending direction of the upper detection arm portion 21. In this case, "right-left symmetry" represents a symmetry with respect to the extending direction of the upper detection arm portion 21. "Up-down symmetry" represents a symmetry with respect to a symmetry axis passing through the center of the fixed portion 20 in a direction orthogonal to the extending direction of the upper detection arm portion 21. And "up-down and right-left symmetry" represents a symmetry which satisfies both of the up-down symmetry and the right-left symmetry.

The fixed portion 20 has a function of floating the upper detection arm portion 21, the lower detection arm portion 22, and the pair of upper drive arm portions 23 inside the internal space G2. The fixed portion 20 has a slit 20A.

The slit 20A decreases the rigidity of the fixed portion 20 to allow the fixed portion 20 easily distorted and deformed. It may be at least a recess which is not passing through the fixed portion 20, and preferably a through-hole passing through the fixed portion 20. The slit 20A has a portion extending at least in a direction intersecting with the extending direction of the upper detection arm portion 21. Preferably, the slit 20A is formed symmetrically with respect to the extending direction of the upper detection arm portion 21, and also formed symmetrically with respect to a symmetry axis passing through the center of the fixed portion 20 in a direction orthogonal to the extending direction of the upper detection arm portion 21. Namely, it is preferred that the slit 20A is right-left symmetrically configured, and further up-down symmetrically configured.

As shown in FIG. 3, the slits 20A, which are in the form of a U-shape, are arranged so that the open sides of the U-shape face to each other in a direction orthogonal to the extending direction of the upper detection arm portion 21 (right-left direction) with the center of gravity P of the angular velocity sensor 2 in between, and also arranged in up-down and right-left symmetry. Here, as for the fixed portion 20, an area surrounded by the slits 20A (center portion 20B) is directly fixed to the sensor element supporting portion 51, and the peripheral portion of the slits 20A (outer edge portion 20C) is connected to the center portion 20B via a beam portion 20D as shown in FIG. 3.

Figure 5:
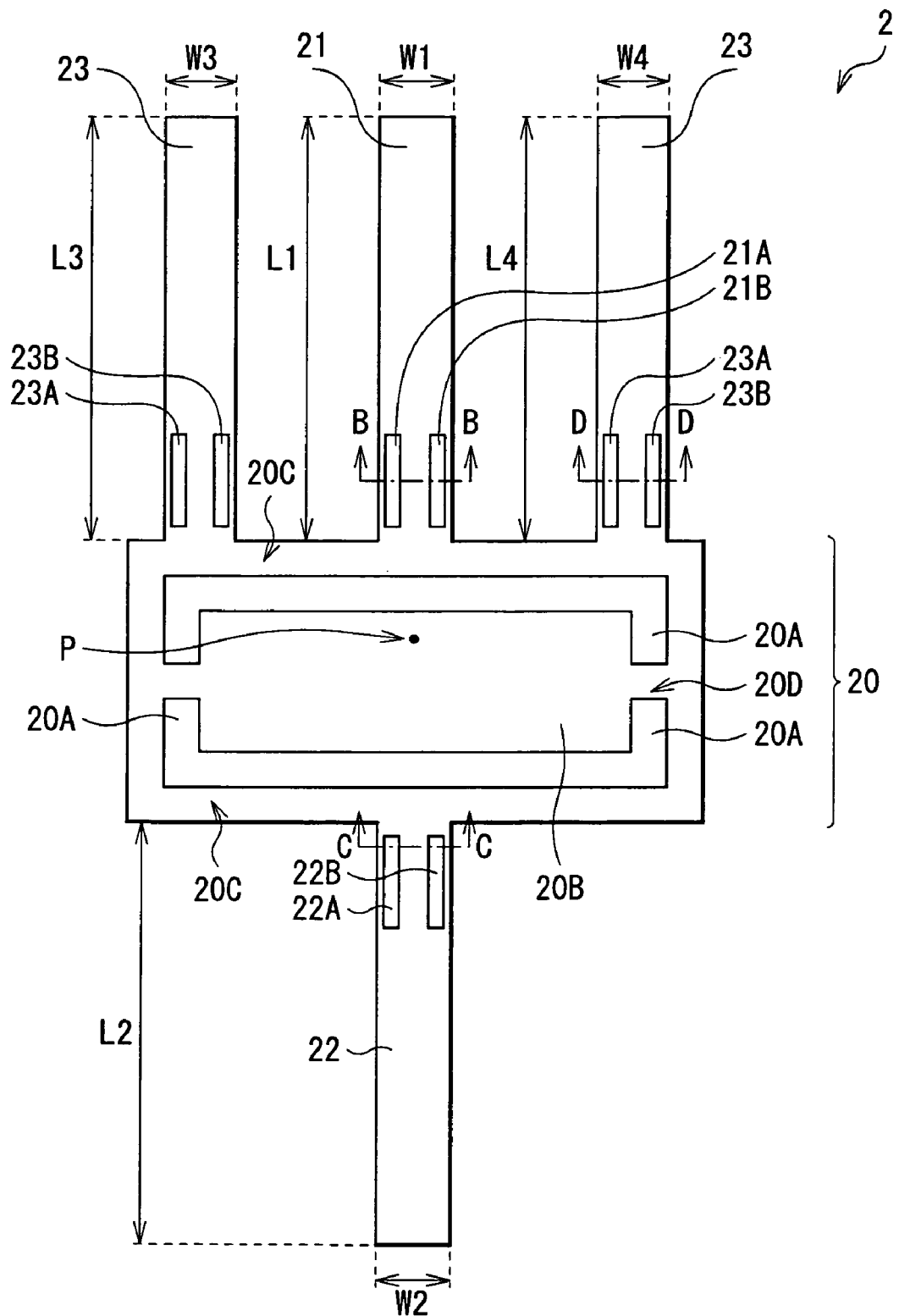
FIG. 5 is a top surface block diagram of an angular velocity sensor according to one modification of FIG. 3.
Figure 6:
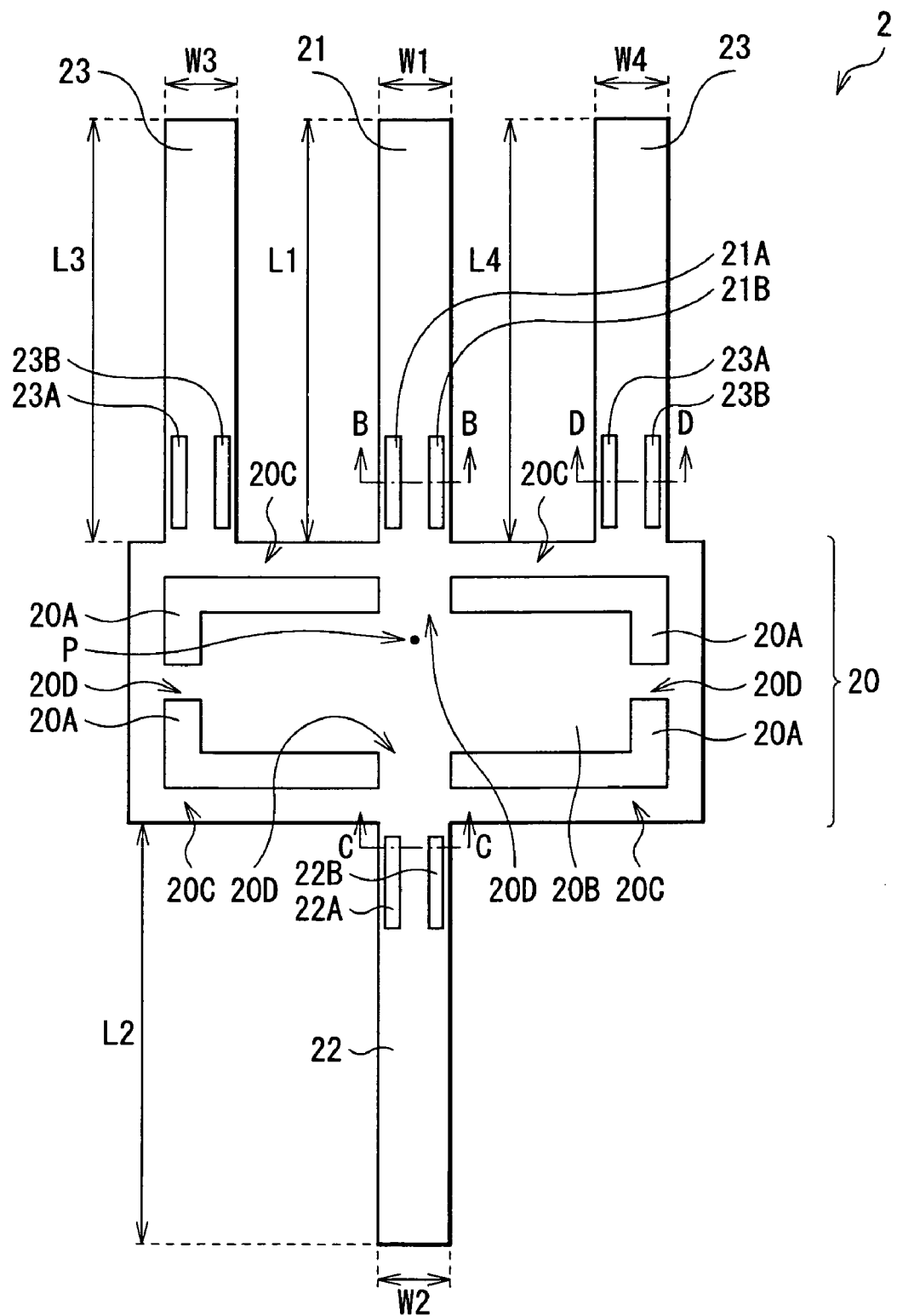
FIG. 6 is a top surface block diagram of an angular velocity sensor according to another modification of FIG. 3.
Figure 7:
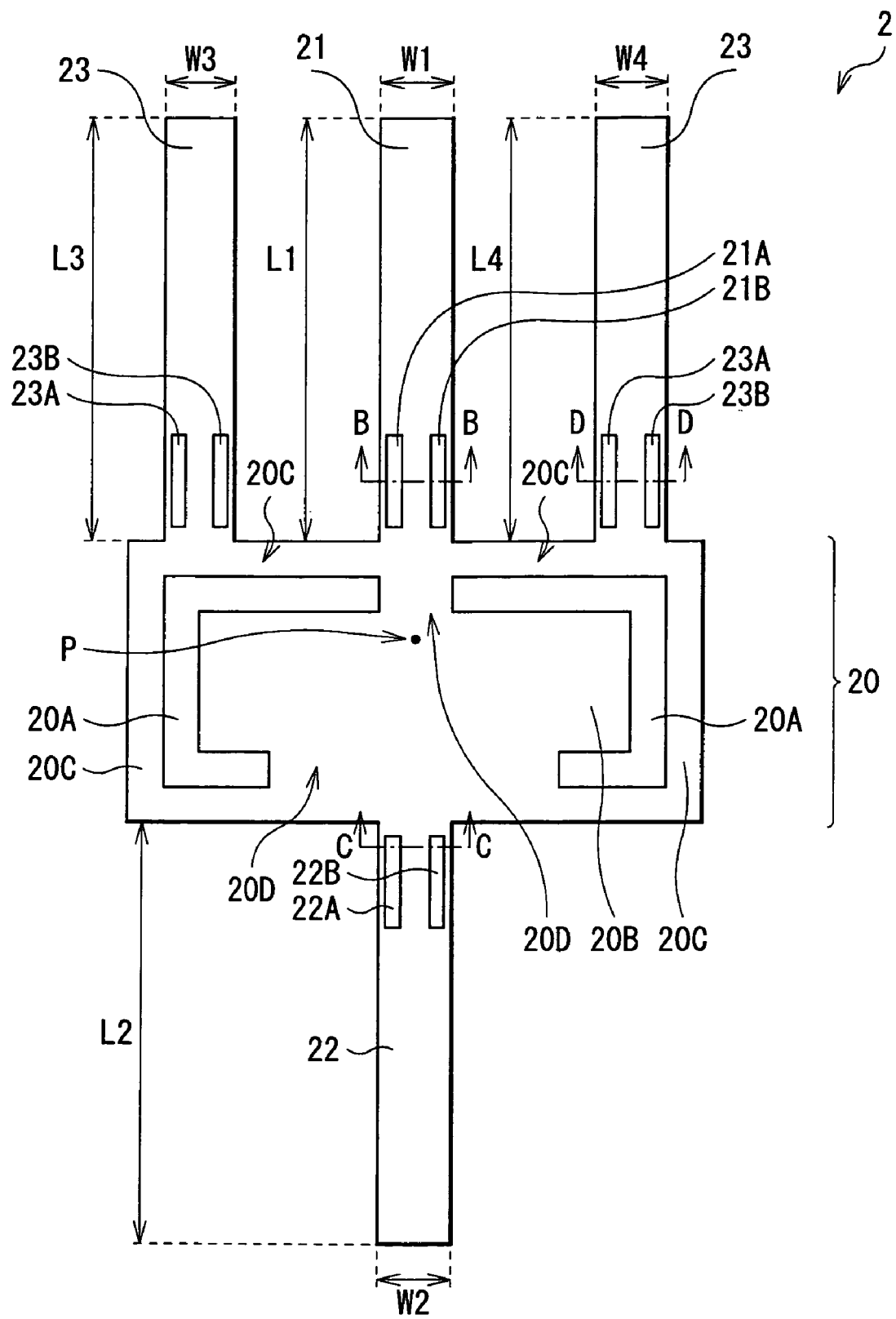
FIG. 7 is a top surface block diagram of an angular velocity sensor according to still another modification of FIG. 3.
Figure 8:
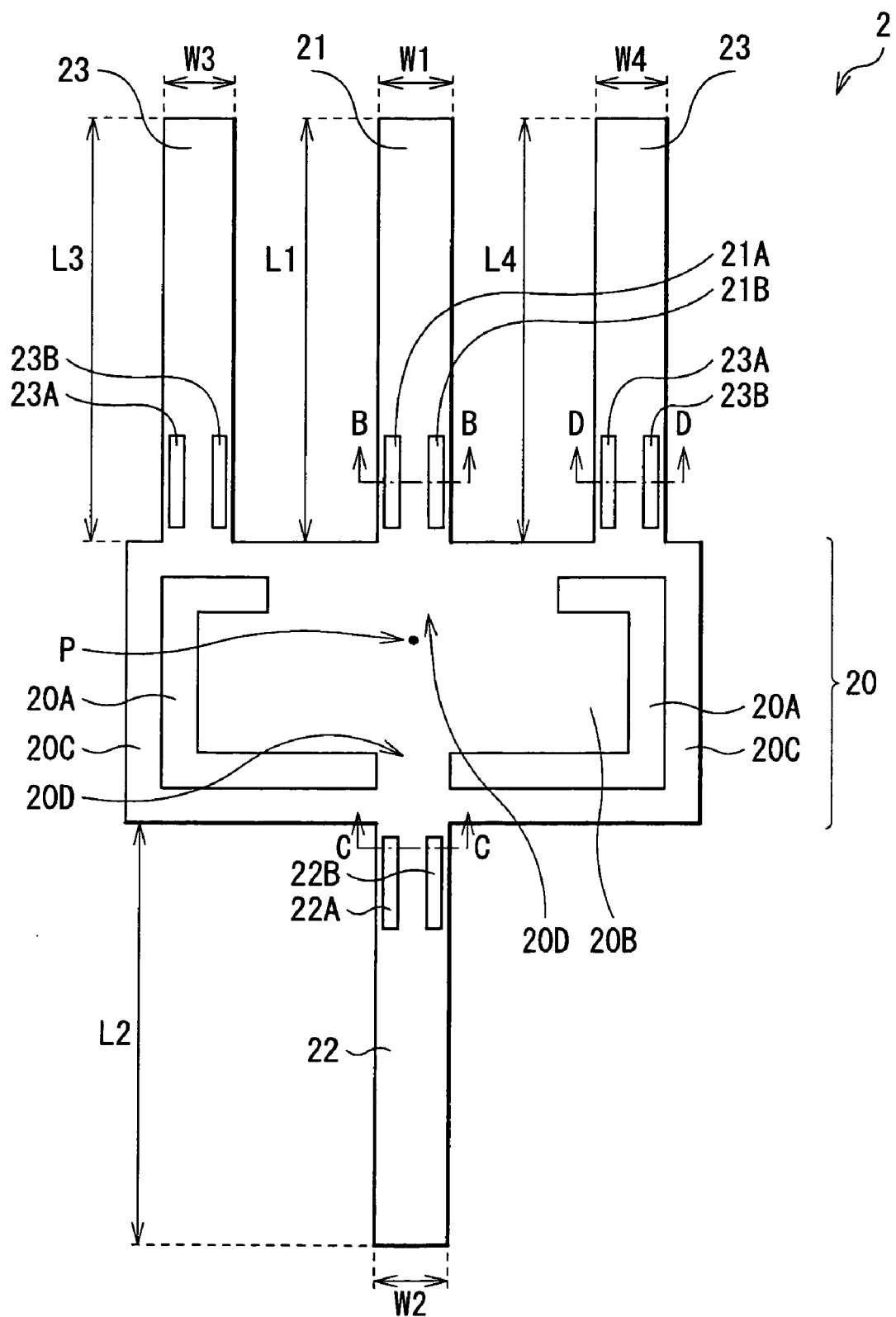
FIG. 8 is a top surface block diagram of an angular velocity sensor according to still another modification of FIG. 3.
Figure 9:
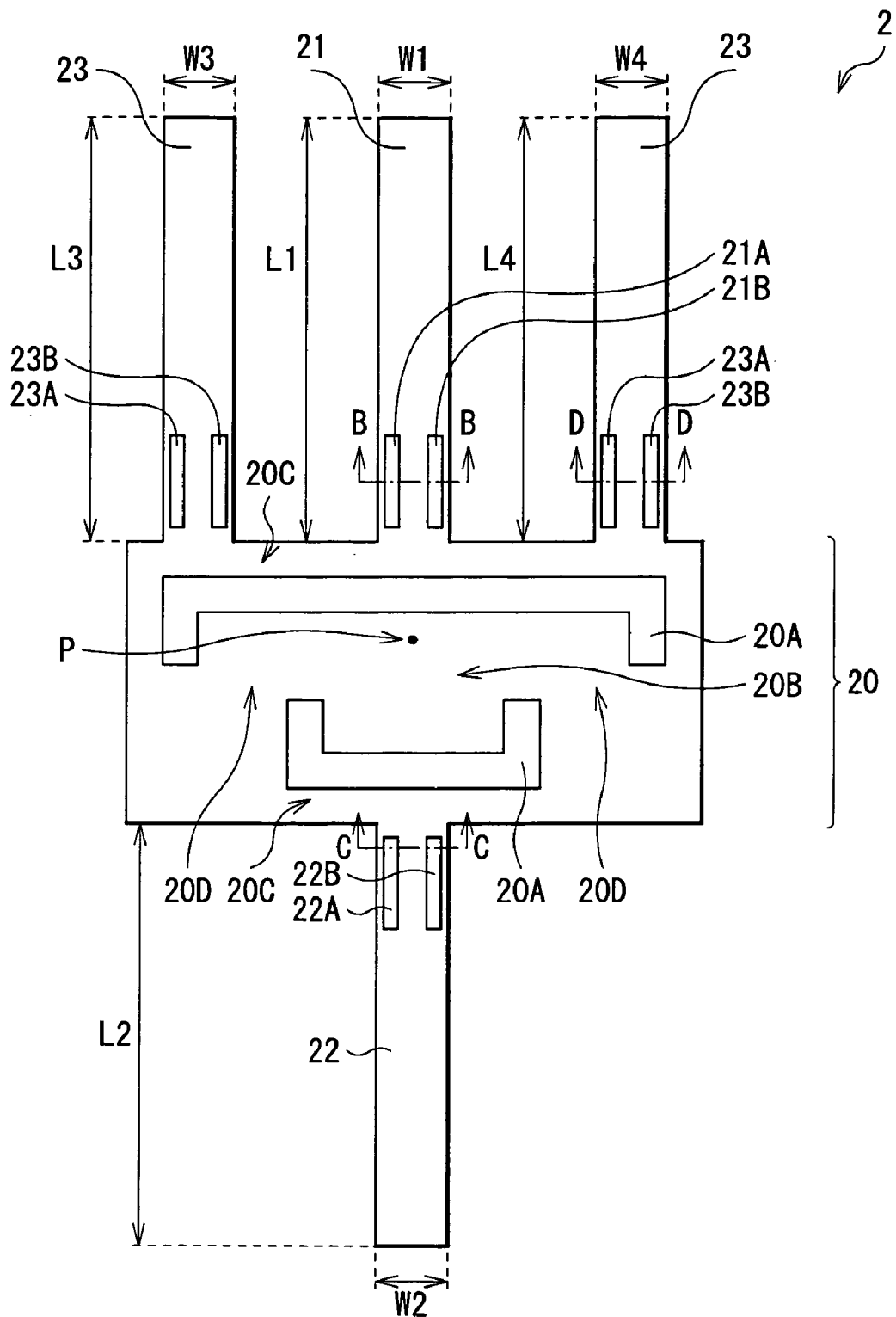
FIG. 9 is a top surface block diagram of an angular velocity sensor according to still another modification of FIG. 3.
Figure 11:
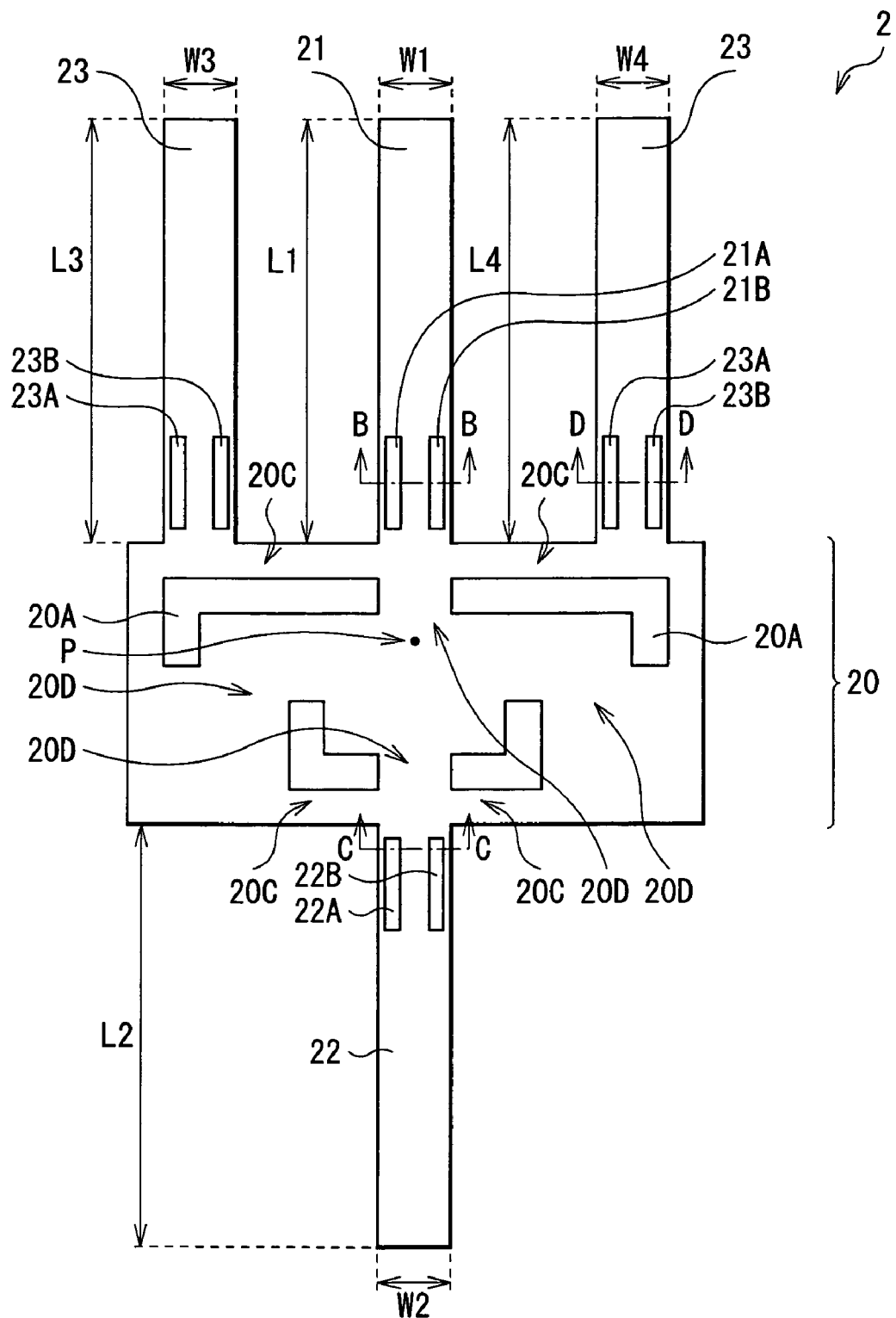
FIG. 11 is a top surface block diagram of an angular velocity sensor according to still another modification of FIG. 3.
Figure 12:
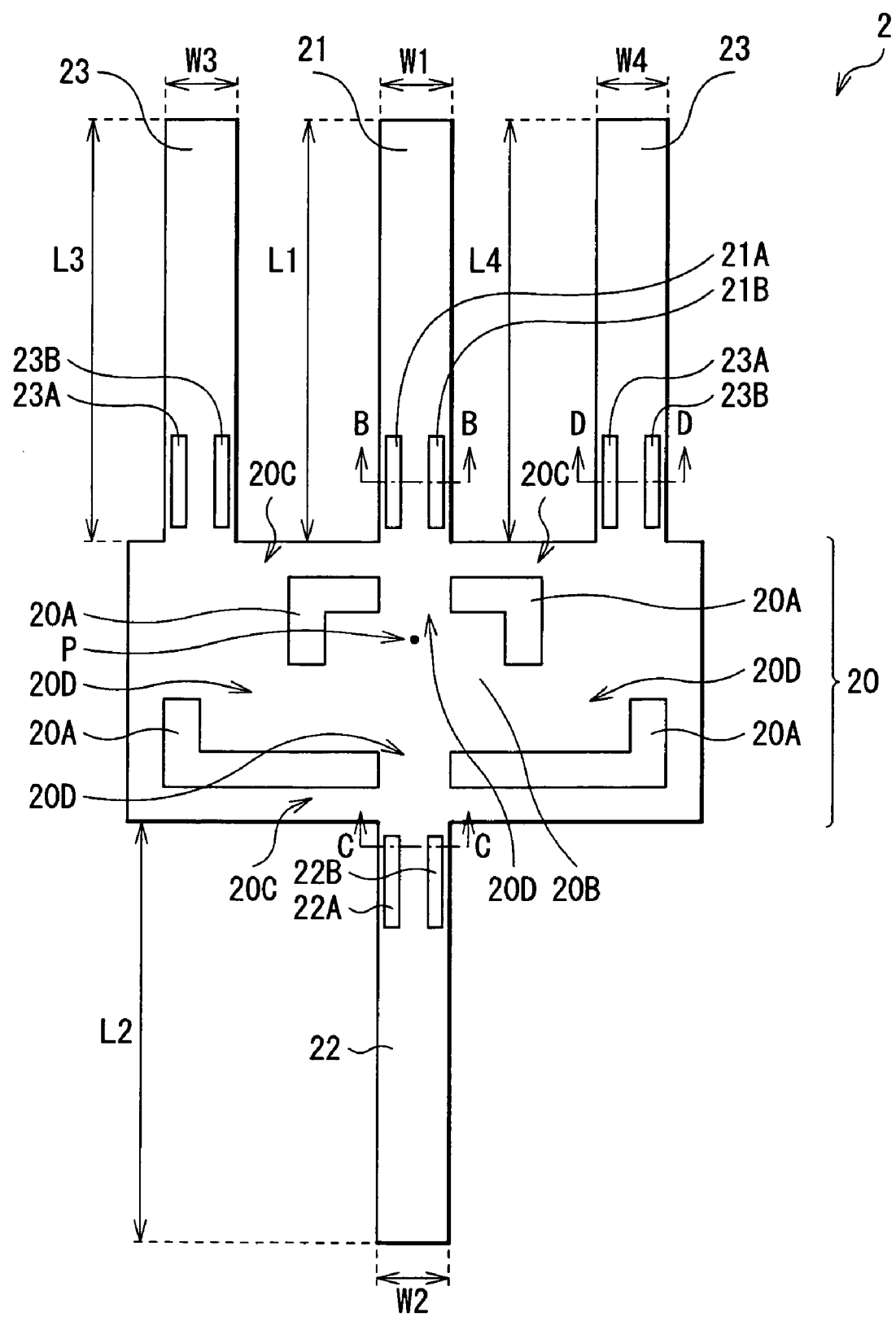
FIG. 12 is a top surface block diagram of an angular velocity sensor according to still another modification of FIG. 3.
Figure 13:
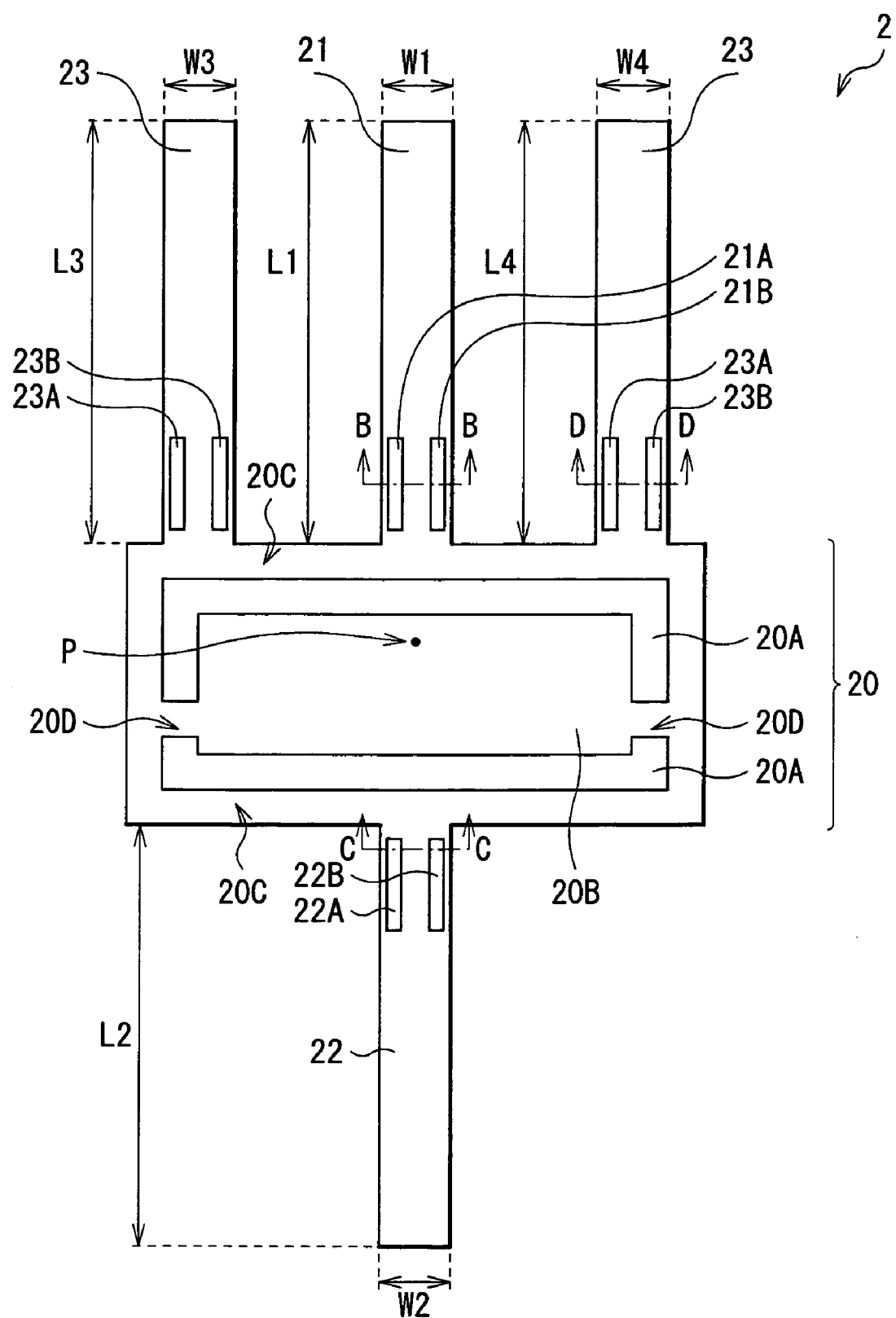
FIG. 13 is a top surface block diagram of an angular velocity sensor according to still another modification of FIG. 3.
Figure 14:
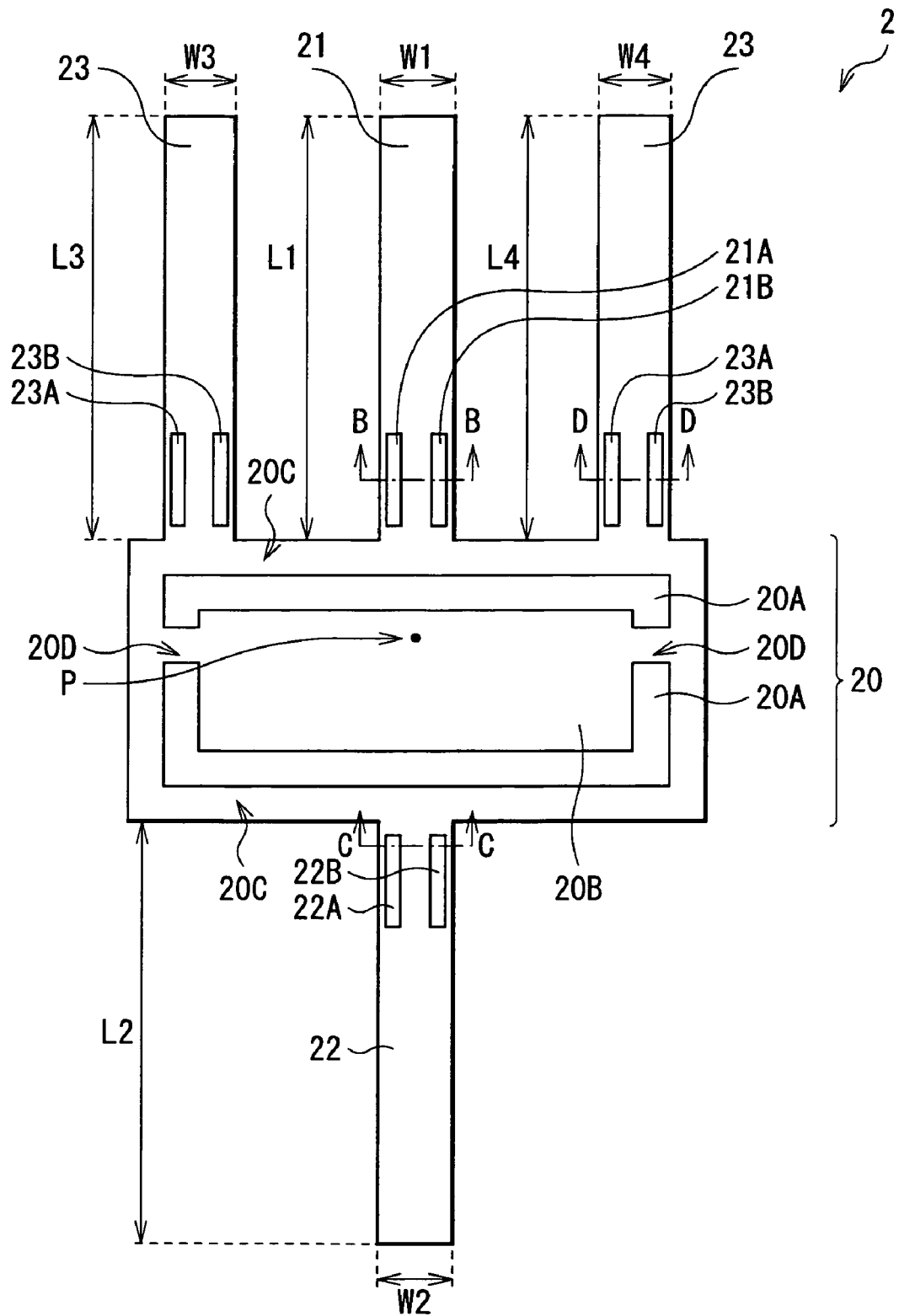
FIG. 14 is a top surface block diagram of an angular velocity sensor according to still another modification of FIG. 3.
Figure 15:
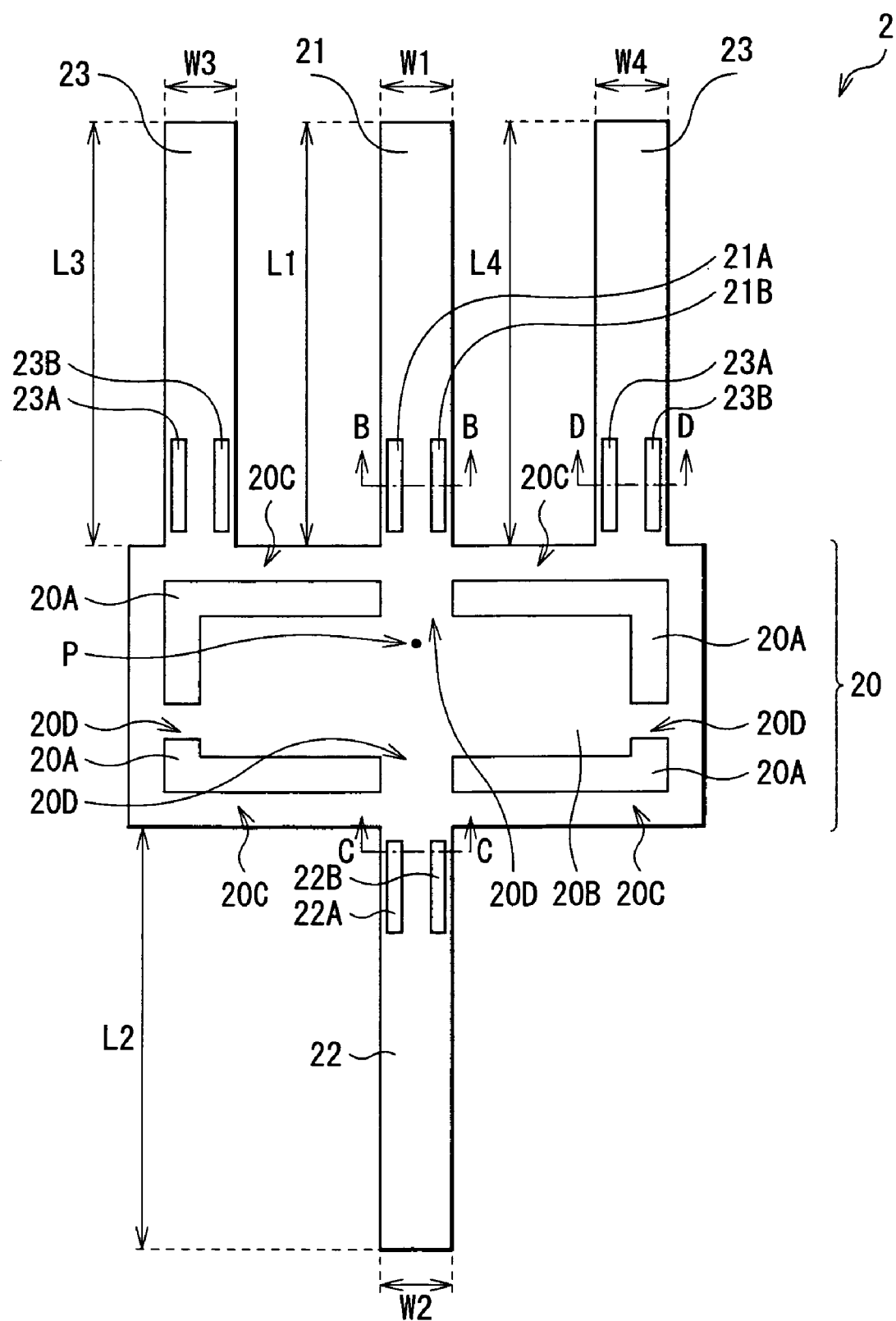
FIG. 15 is a top surface block diagram of an angular velocity sensor according to still another modification of FIG. 3.
Figure 16:
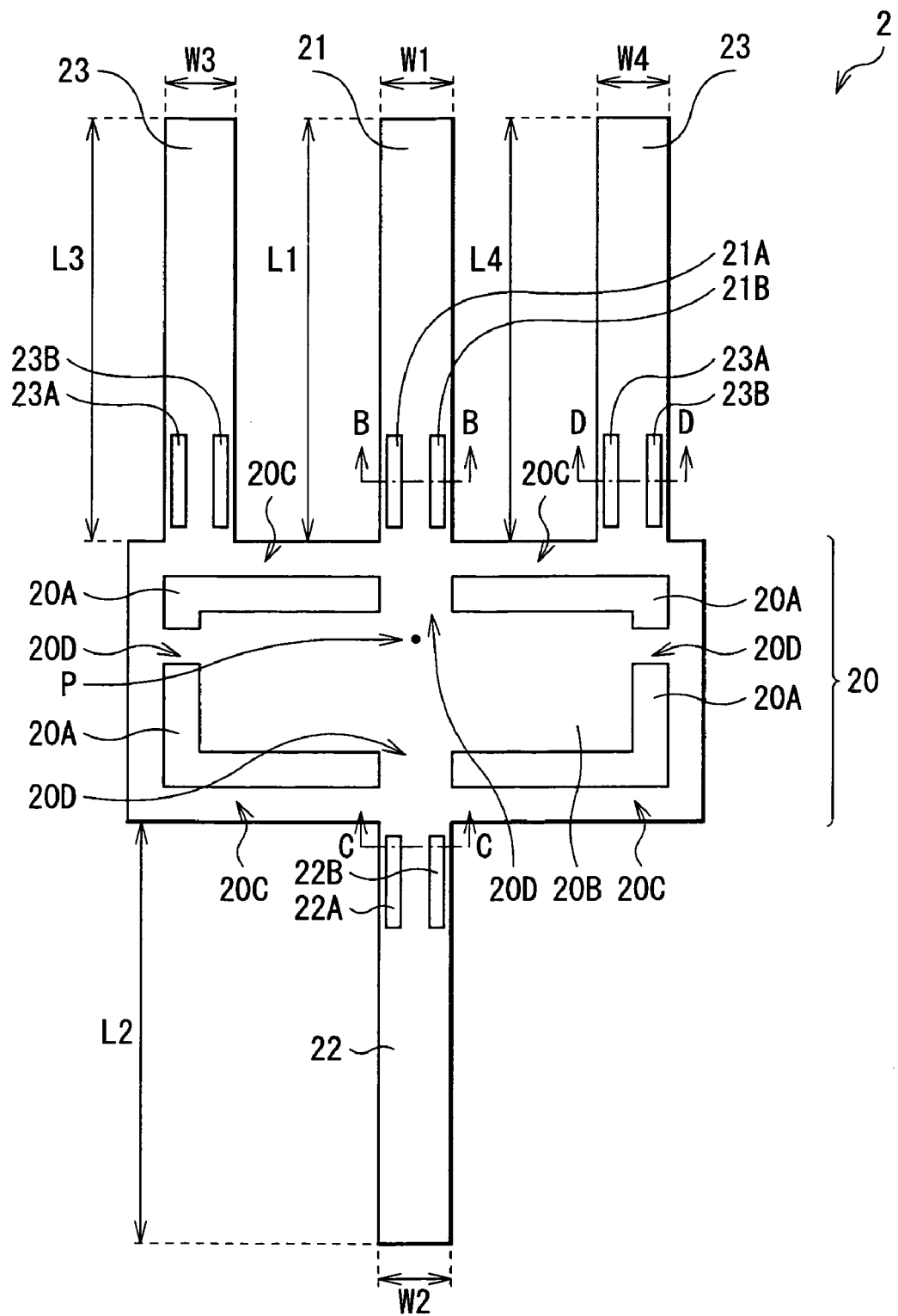
FIG. 16 is a top surface block diagram of an angular velocity sensor according to still another modification of FIG. 3.

The slit 20A is not limited to the above-mentioned embodiment. For example, as shown in FIG. 5, the slits 20A of a U-shape may be arranged so that the open sides of the U-shape may face to each other in the extending direction of the upper detection arm portion 21 (up-down direction) with the center of gravity P of the angular velocity sensor 2 in between, and arranged in up-down and right-left symmetry. Alternatively, the four L-shaped slits 20A may be arranged as shown in FIG. 6 for example, so that the open sides of the L-shape face to each other surrounding the center of gravity P, and arranged in up-down and right-left symmetry.

The slit 20A need not be an up-down symmetry. For example, the portions extending in the direction orthogonal to the extending direction of the upper detection arm portion 21 may not be equal in length to each other while maintaining the right-left symmetry, as shown in FIGS. 7 to 12. For another example, the portions that extend in the extending direction of the upper detection arm portion 21 may not be equal in length to each other while maintaining the right-left symmetry as shown in FIGS. 13 to 16.

Figure 17:
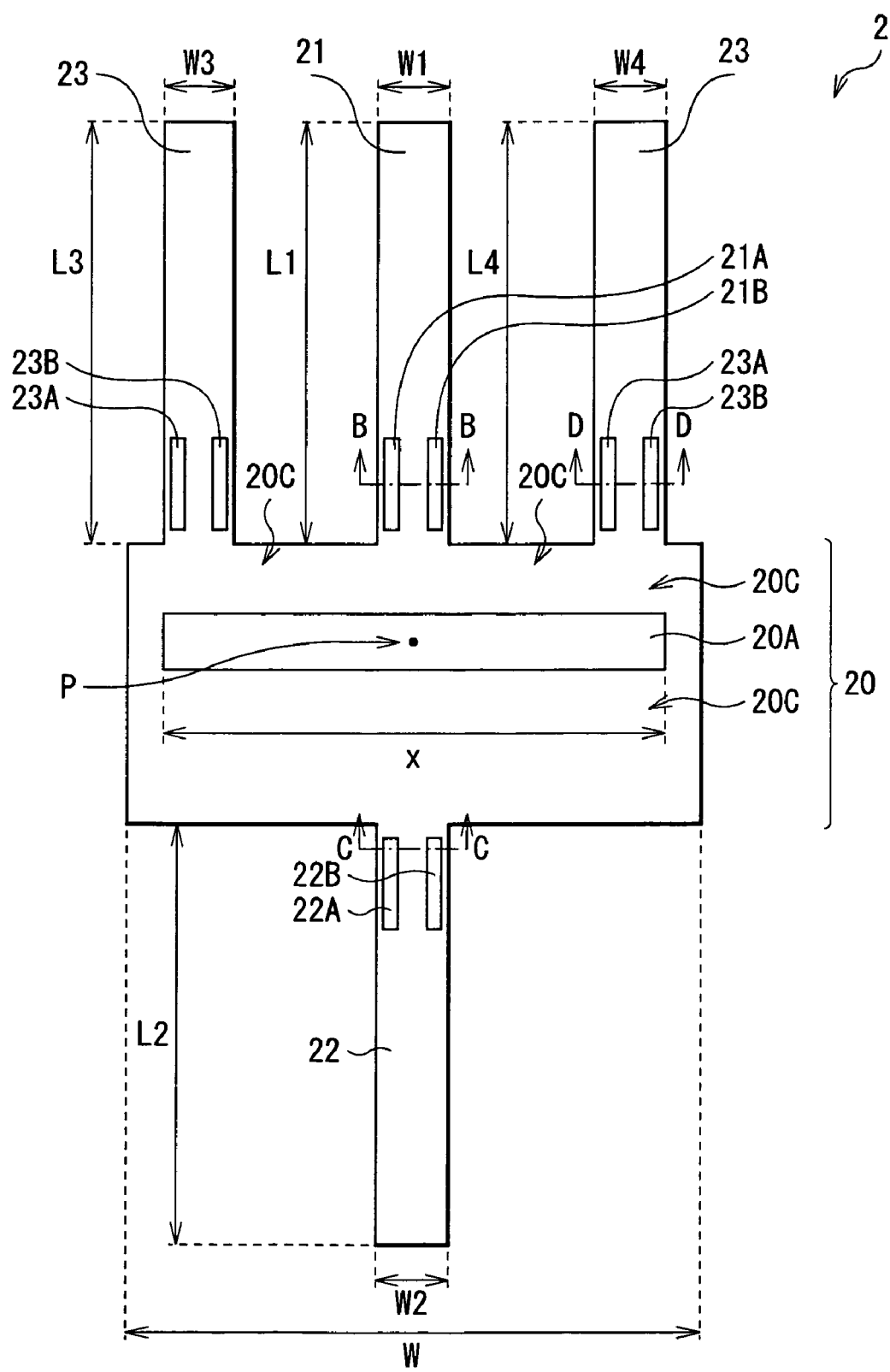
FIG. 17 is a top surface block diagram of an angular velocity sensor according to still another modification of FIG. 3.

The slit 20A need not be configured to surround the center of gravity P, and may be configured, for example, to include the center of gravity P. Specifically, the slit 20A may by typically configured in the form of a straight line (stripe) extending in the right-left direction as shown in FIG. 17. In this case, it is preferred that the slit 20A is configured to satisfy the following relational expression:

$$x/W \geqq 0.5$$

where x is the width of the slit 20A in the right-left direction and W is the width of the fixed portion 20 in the right-left direction.

Figure 18:
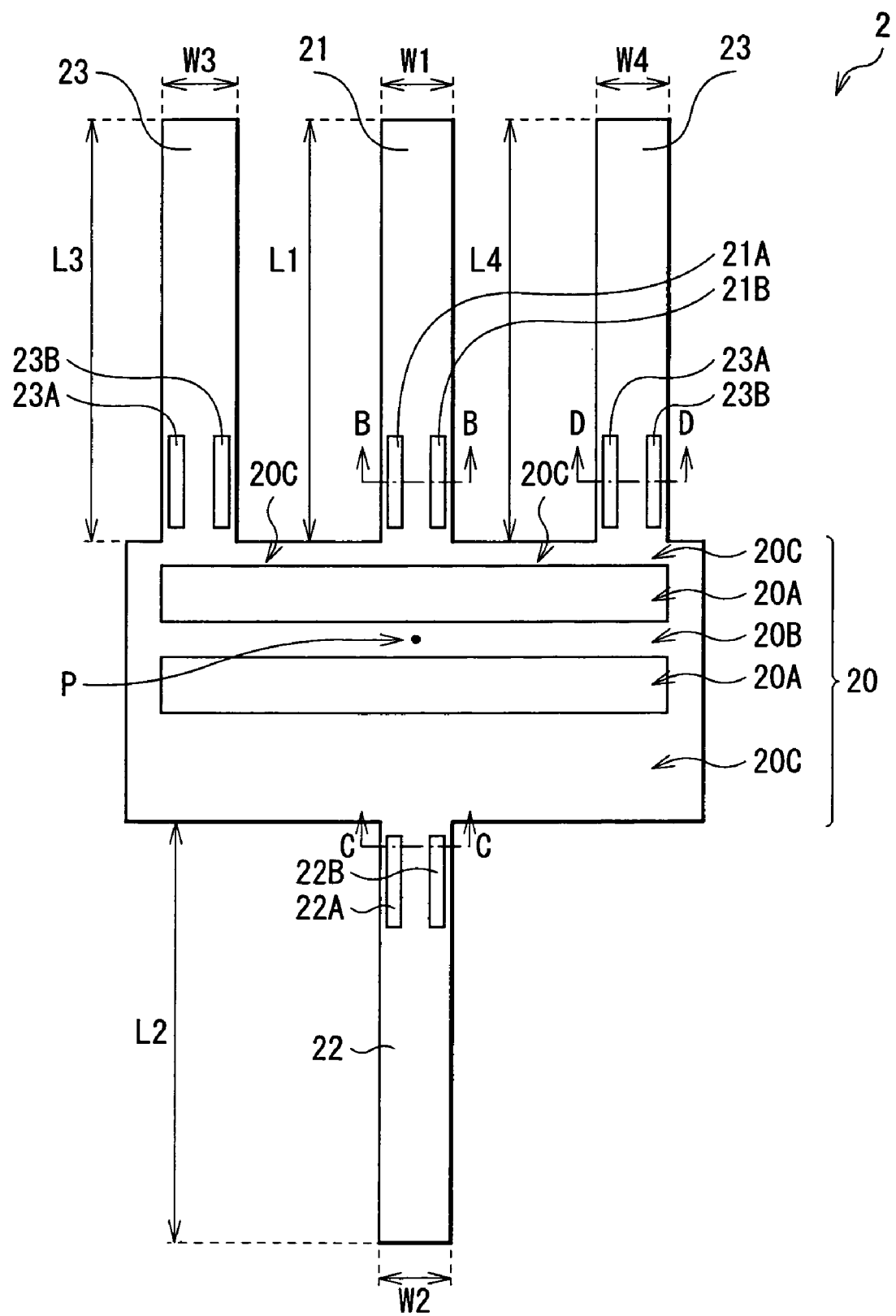
FIG. 18 is a top surface block diagram of an angular velocity sensor according to still another modification of FIG. 3.
Figure 19:
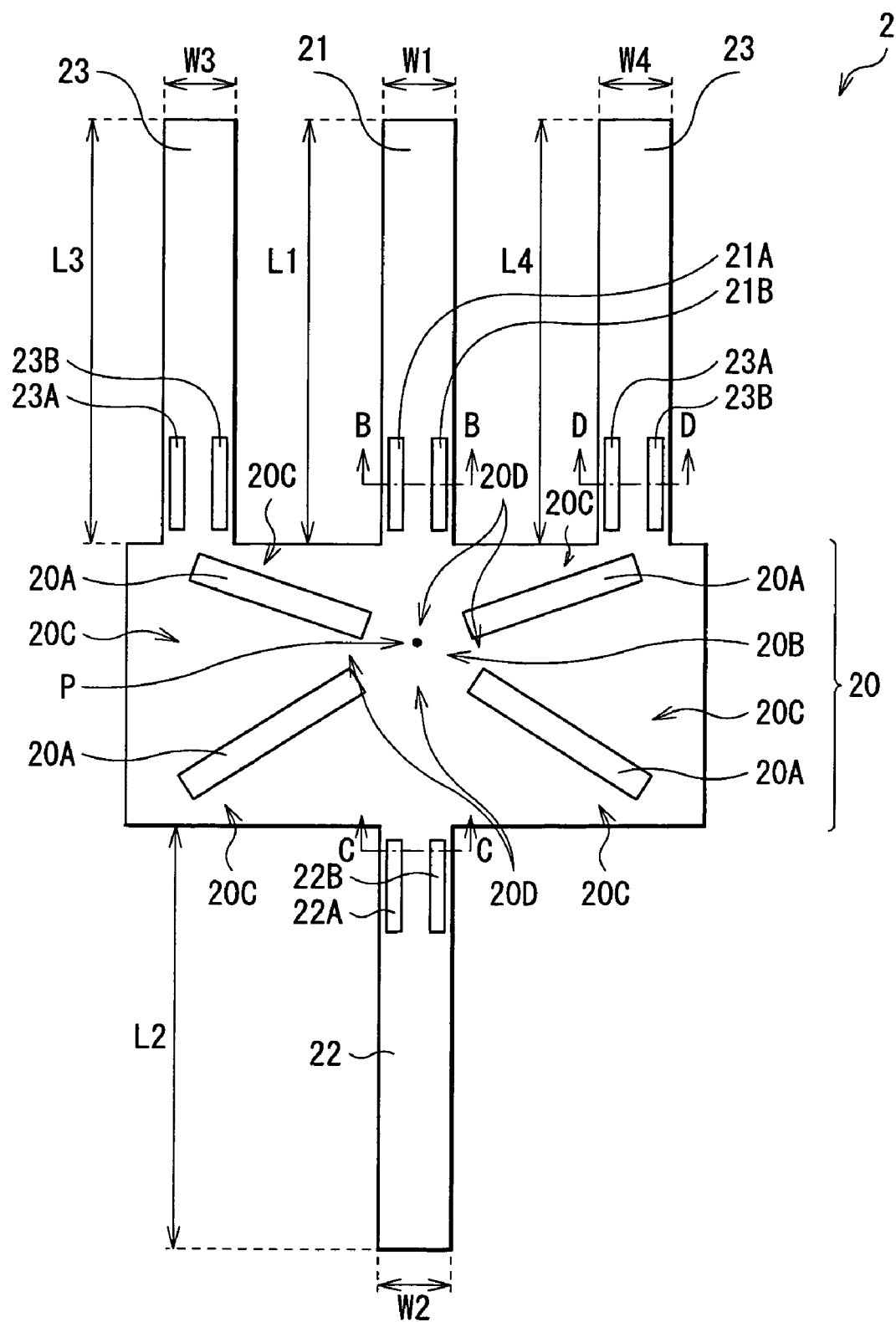
FIG. 19 is a top surface block diagram of an angular velocity sensor according to still another modification of FIG. 3.

When a plurality of the slits 20A are formed in the fixed portion 20, only one of them may be configured to include the center of gravity P, or none of the slits 20A may include the center of gravity P as shown in FIG. 18. Only one slit 20A may be formed in the fixed portion 20, for example, as shown in FIG. 17, or two slits 20A may be arranged in parallel with each other along the up-down direction while extending in the right-left direction, as shown in FIG. 18. The slit 20A may be configured, for example, in the form of a straight line that extends in a direction intersecting with the extending direction of the upper detection arm portion 21 at an given angle smaller than 90 degrees and larger than 0 degrees (oblique direction), as shown in FIG. 19.

Figure 20:
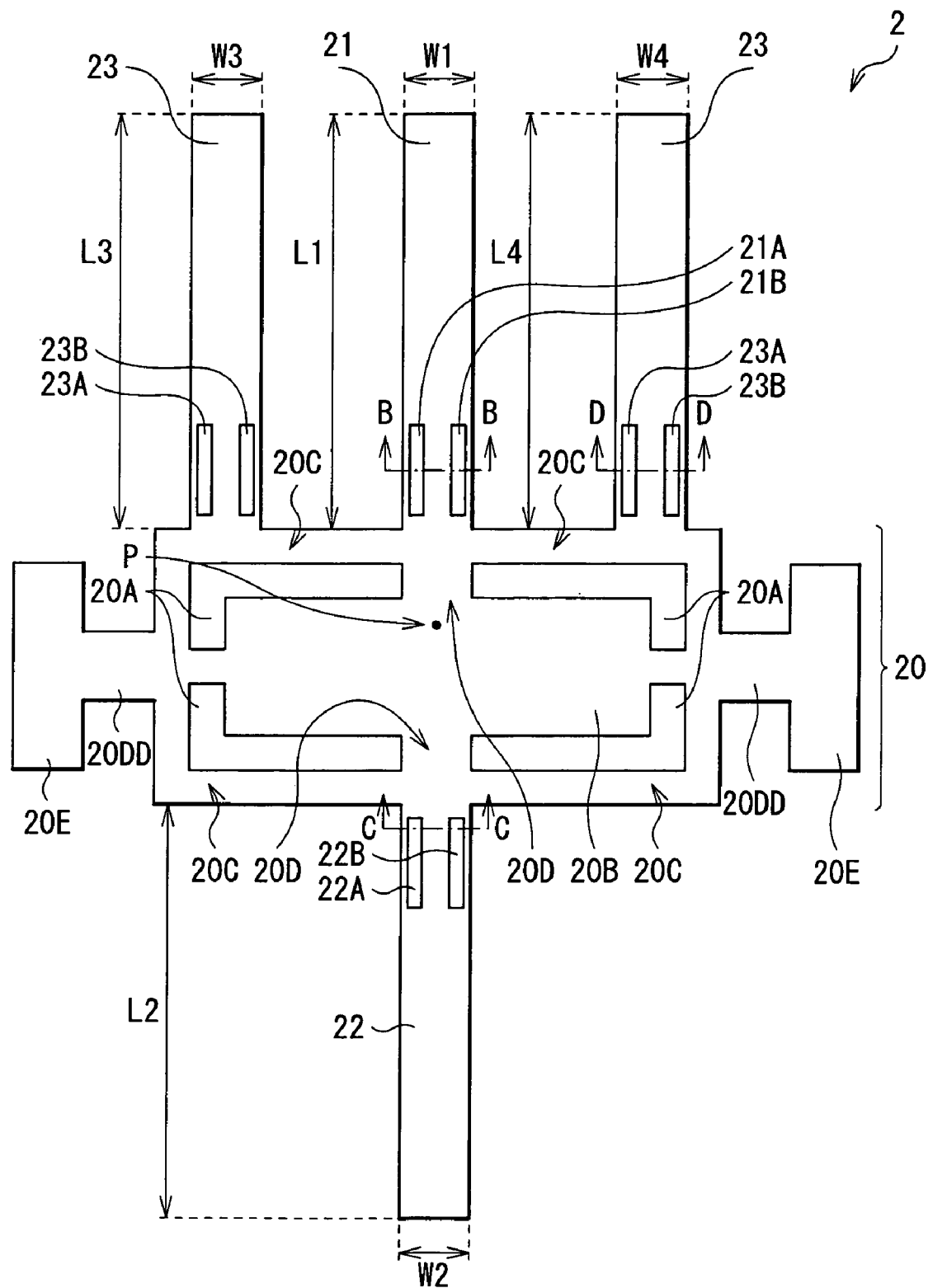
FIG. 20 is a top surface block diagram of an angular velocity sensor according to still another modification of FIG. 3.
Figure 21:
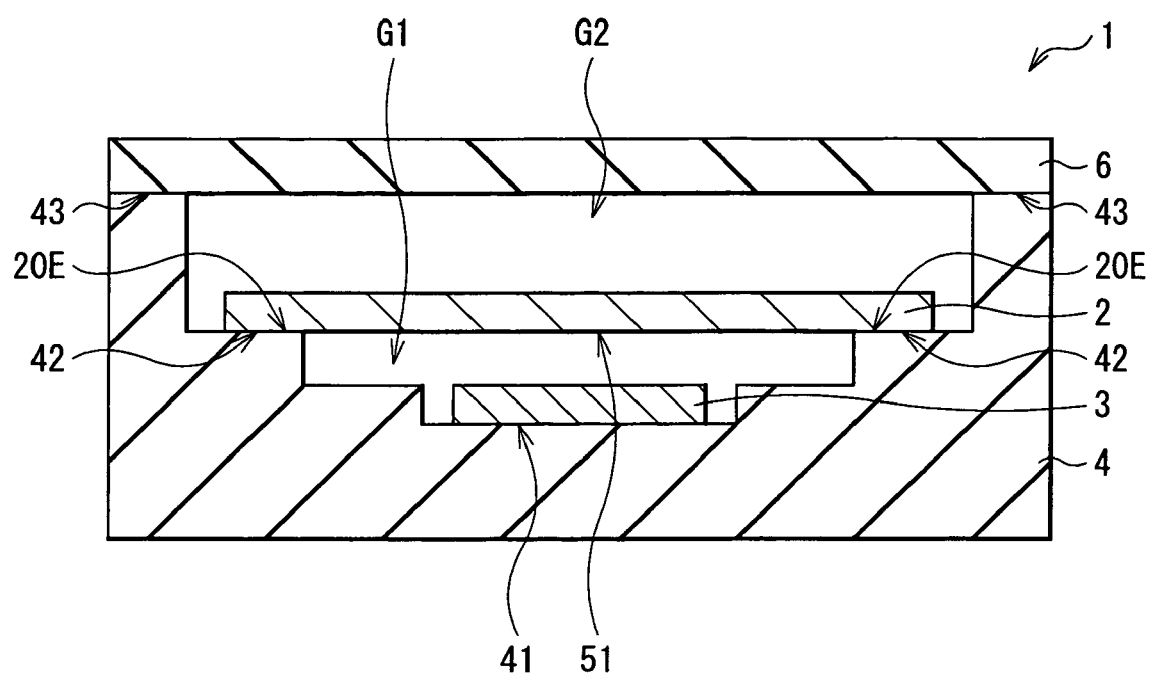
FIG. 21 is a cross sectional view showing a configuration of the angular velocity sensing device including the angular velocity sensor of FIG. 20.

The fixed portion 20 is not limited to the configuration as shown in FIG. 3, in which the area surrounded by the slits 20A (center portion 20B) is directly fixed to the sensor element supporting portion 51. For example, the fixed portion 20 may include a pair of rectangular fixed beam portions 20DD connected to both ends of the outer edge portion 20C and a pair of rectangular fixed end portions 20E respectively connected to the ends of the pair of fixed beam portions 20DD as shown in FIG. 20. In this case, typically, the inner-cover section 5 may be removed so as to fix the bottoms of the fixed end portions 20E to the upper surface of the inner-cover section supporting portion 42 of the casing 4, as shown in FIG. 21. For another example, the fixed portion 20 may include an annular fixed end portion 20F configured to surround the center portion 20B instead of the pair of fixed end portions 20E so that the bottom surface of the fixed end portion 20F may be fixed to the upper surface of the inner-cover section supporting portion 42 of the casing 4, as shown in FIG. 22.

Figure 22:
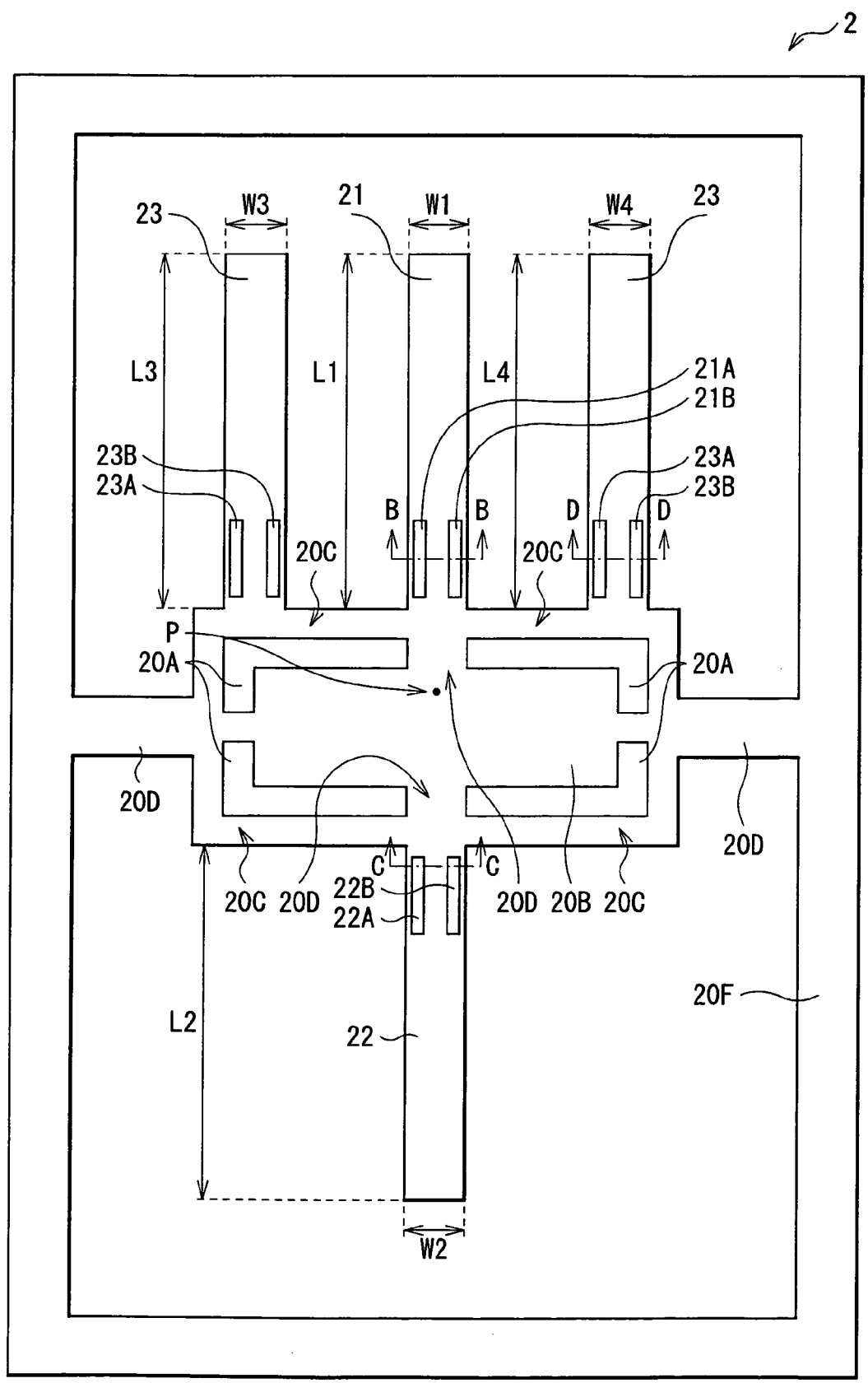
FIG. 22 is a top surface block diagram of an angular velocity sensor according to still another modification of FIG. 3.

It is to be noted that the configuration and size of the fixed portion 20 is not limited to those exemplified in FIG. 3 and in FIGS. 20 to 22. Any kind of configuration and size is available as long as enable to float the upper detection arm portion 21, the lower detection arm portion 22 and the pair of upper drive arm portions 23 inside the internal space.

The upper detection arm portion 21 and the lower detection arm portion 22 generate a vibration in accordance with the magnitude of a distortion of the fixed portion 20 when the distortion thereof generated by the application of the Coriolis force to the pair of upper drive arm portions 23 has been transmitted to the upper detection arm portion 21 and the lower detection arm portion 22. The upper detection arm portion 21 is connected to one side of the fixed portion 20 (herein one side of the outer edge portion 20C of FIG. 3), and extending away from the fixed portion 20 along a plane parallel to the top surface of the sensor element supporting portion 51. On the other hand, the lower detection arm portion 22 is connected to the fixed portion 20 on a side opposite to the upper detection arm portion 21 (herein the other side of the outer edge portion 20C of FIG. 3), and extending away from the fixed portion 20 along the plane parallel to the top surface of the sensor element supporting portion 51.

Although it is preferred that both of the upper detection arm portion 21 and the lower detection arm portion 22 extend in directions parallel to each other, they may be extending in mutually intersecting directions with a given angle. It is also preferred that the upper detection arm portion 21 and the lower detection arm portion 22 are formed symmetrically with respect to a symmetry axis passing through the center of the fixed portion 20 and extending in a direction orthogonal to the extending direction of the upper detection arm portion 21. However, other configuration is also allowable.

Figure 23:
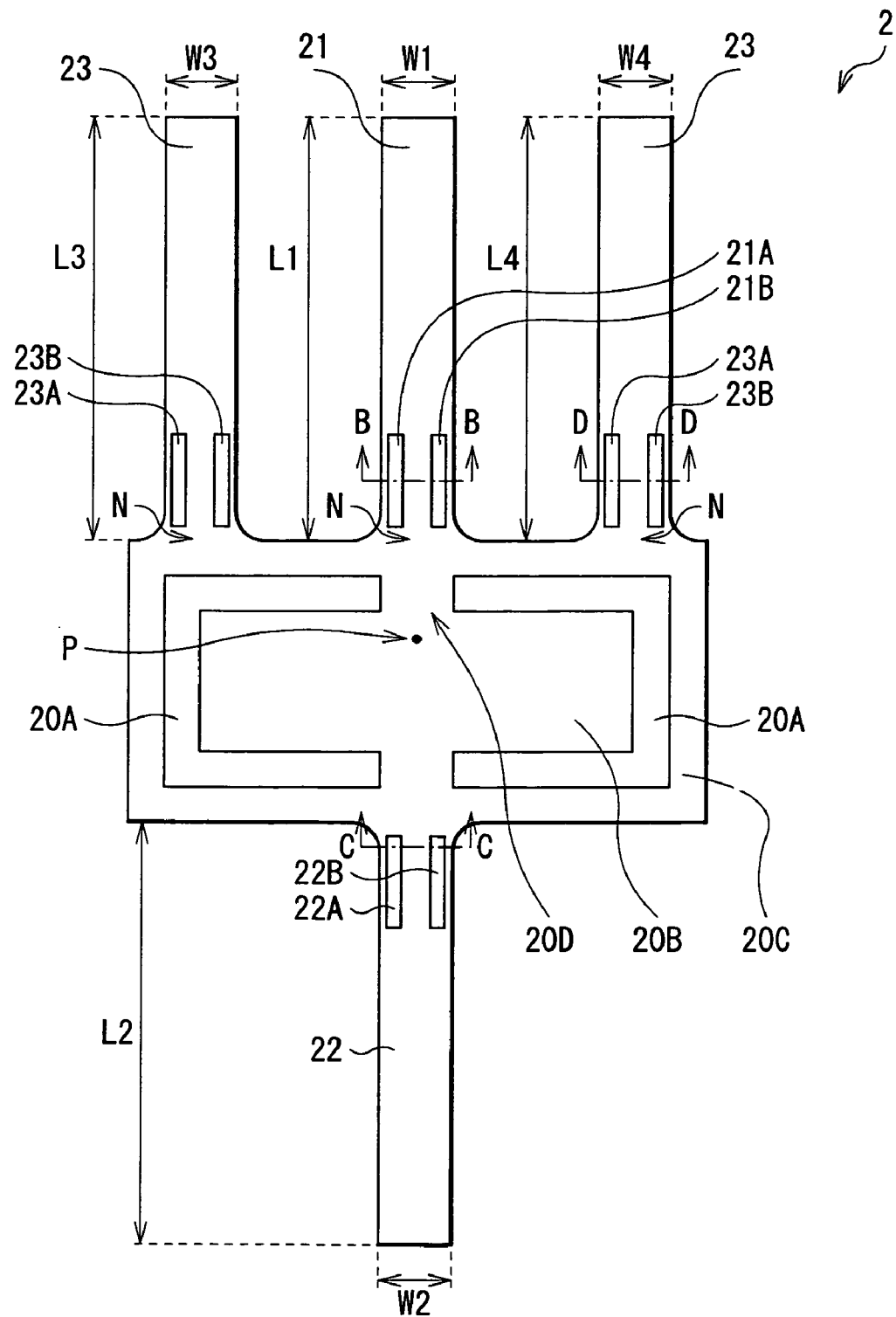
FIG. 23 is a top surface block diagram of an angular velocity sensor according to still another modification of FIG. 3.

The upper drive arm portion 23 generates the Coriolis force thereon when an object, which is equipped with the angular velocity sensing device 1 thereupon, rotates with respect to a rotation axis extending in a direction orthogonal to a plane including the top surface of the sensor element supporting portion 51 (namely, a direction vertical to the face of the paper of FIG. 3). Each of the upper drive arm portions 23 is connected to the fixed portion 20 on the same side where the upper detection arm portion 21 is connected (in FIG. 3, one side of the outer edge portion 20C) and extending away from the fixed portion 20 along a plane parallel to the top surface of the sensor element supporting portion 51. That is, connection points N, each of which connects the fixed portion 20 to each of the upper detection arm portion 21 and the pair of upper drive arm portions 23, are linearly arranged in the right-left direction. It is to be noted that, even when the connection points N respectively include a flare portion as shown in FIG. 23, it can be said that they are linearly arranged along the right-left direction.

Each of the upper drive arm portions 23 is disposed separately from the upper detection arm portion 21 with an appropriate distance to avoid collision with each other when they are all vibrating simultaneously. It is preferred that the upper drive arm portions 23 extend in directions parallel to each other, but they may extend in mutually-intersecting directions with a given angle. It is also preferred that the upper drive arm portions 23 are formed symmetrically with respect to the upper detection arm portion 21 (right-left symmetry), but they may not be always configured in such a manner. It is also preferred that the upper detection arm portion 21, the lower detection arm portion 22, and the pair of upper drive arm portions 23 extend in directions parallel to each other, but they may extend in mutually intersecting directions with a given angle.

Here, the fixed portion 20, the upper detection arm portion 21, the lower detection arm portion 22, and the pair of upper drive arm portions 23 can be typically made of a common material such as silicon and can be produced in bulk formation by patterning a wafer.

A pair of piezoelectric elements 21A and 21B are formed upon the face of the upper detection arm portion 21 in such a manner as to extend in a direction parallel to the extending direction of the upper detection arm portion 21. The pairs of piezoelectric elements 21A and 21B have a function of detecting a vibration of the upper detection arm portion 21 when it vibrates along the plane parallel to the plane including the sensor element supporting portion 51 of the casing 4. It is preferred that the pairs of piezoelectric elements 21A and 21B are arranged side by side along a width direction of the upper detection arm portion 21.

A pair of piezoelectric elements 22A and 22B are formed upon the face of the lower detection arm portion 22 in such a manner as to extend in a direction parallel to the extending direction of the lower detection arm portion 22. As with the pair of piezoelectric elements 21A and 21B, the pair of piezoelectric elements 22A and 22B have a function of detecting a vibration of the lower detection arm portion 22 when it vibrates along the plane parallel to the top surface of the sensor element supporting portion 51 of the casing 4. It is preferred that the pairs of piezoelectric elements 22A and 22B are arranged side by side along a width direction of the lower detection arm portion 22.

A pair of piezoelectric elements 23A and 23B are formed upon the face of each of the upper drive arm portions 23 in such a manner as to extend in a direction parallel to an extending direction of the upper drive arm portions 23. The pair of piezoelectric elements 23A and 23B serve to vibrate the respective upper drive arm portions 23 along the plane parallel to the top surface of the sensor element supporting portion 51 of the casing 4, and preferably are arranged side by side along the width direction of the upper drive arm portions 23.

Here, the piezoelectric elements 21A, 22A, and each of 23A are typically formed by respectively layering insulating layers 21A1, 22A1 and 23A1, lower electrodes 21A2, 22A2 and 23A2, piezoelectric crystals 21A3, 22A3 and 23A3, and upper electrodes 21A4, 22A4 and 23A4 in this order, on the upper detection arm portion 21, the lower detection arm portion 22, and the upper drive arm portions 23 respectively, as shown in FIG. 4. The piezoelectric elements 21B, 22B and 23B are formed by respectively layering insulating layers 21B1, 22B1 and 23B1, lower electrodes 21B2, 22B2 and 23B2, piezoelectric crystals 21B3, 22B3 and 23B3, and upper electrodes 21B4, 22B4 and 23B4 in this order, on the upper detection arm portion 21, the lower detection arm portion 22, and the upper drive arm portions 23 respectively, as shown in FIG. 4. That is, piezoelectric elements 21A, 22A and 23A and piezoelectric elements 21B, 22B and 23B are formed independently of each other.

Figure 24:
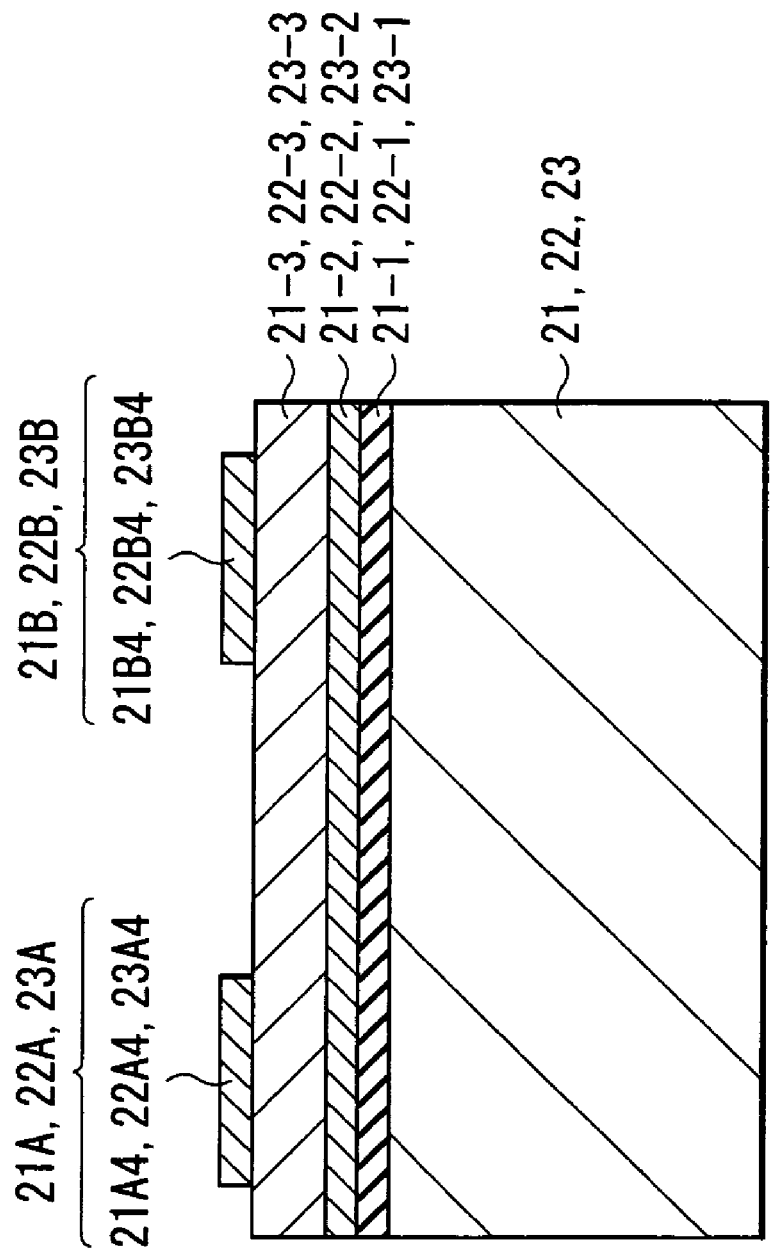
FIG. 24 is a cross sectional view of the angular velocity sensor according to one modification of FIG. 4.

As shown in FIG. 24, it is also possible that the insulating layers 21A1, 22A1 and 23A1, and the insulating layers 21B1, 22B1 and 23B1 are formed from common insulating layers 21-1, 22-1 and 23-1 respectively, for example. The lower electrodes 21A2, 22A2 and 23A2, the lower electrodes 21B2, 22B2 and 23B2 may also be formed from common lower electrodes 21-2, 22-2 and 23-2 respectively, for example. The piezoelectric crystal 21A3, 22A3 and 23A3, and the piezoelectric crystal 21B3, 22B3 and 23B3 may also be formed from common piezoelectric crystals 21-3, 22-3 and 23-3 respectively, for example.

Herein, the insulating layers 21A1, 22A1, 23A1, 21B1, 22B1, 23B1, 21-1, 22-1 and 23-1 are typically formed by layering a $ZrO_2$ film and an $Y_2O_3$ film in order. The lower electrodes 21A2, 22A2, 23A2, 21B2, 22B2, 23B2, 21-2, 22-2 and 23-2 are typically made of a Pt (100) orientation film. The piezoelectric crystals 21A3, 22A3, 23A3, 21B3, 22B3, 23B3, 21-3, 22-3 and 23-3 are typically formed including lead zirconate titanate (PZT). The upper electrodes 21A4, 22A4, 23A4, 21B4, 22B4 and 23B4 are typically made of a Pt (100) orientation film.

Figure 25:
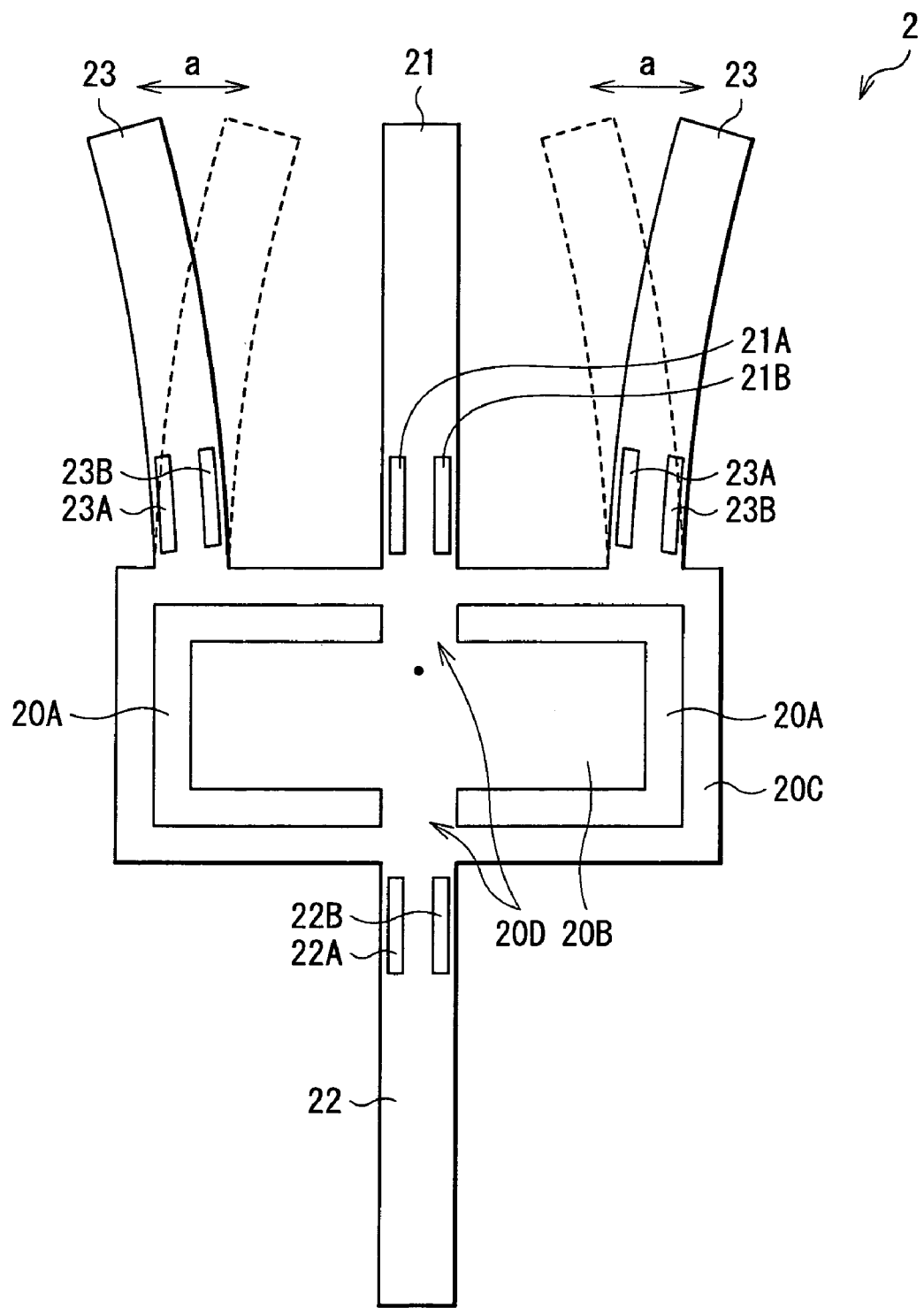
FIG. 25 is a top surface block diagram for explaining an operation of the angular velocity sensor of FIG. 1 when rotational motion is not applied thereto.

In the angular velocity sensing device 1 of the present embodiment and its modifications, when the pair of upper drive arm portions 23 are driven using the piezoelectric elements 23A and 23B in the case where an object equipped with the angular velocity sensing device 1 is not rotated, for example, the pair of upper drive arm portions 23 mostly vibrate in a direction "a" orthogonal to the extending direction of the upper drive arm portions 23, as shown in FIG. 25.

Figure 26:
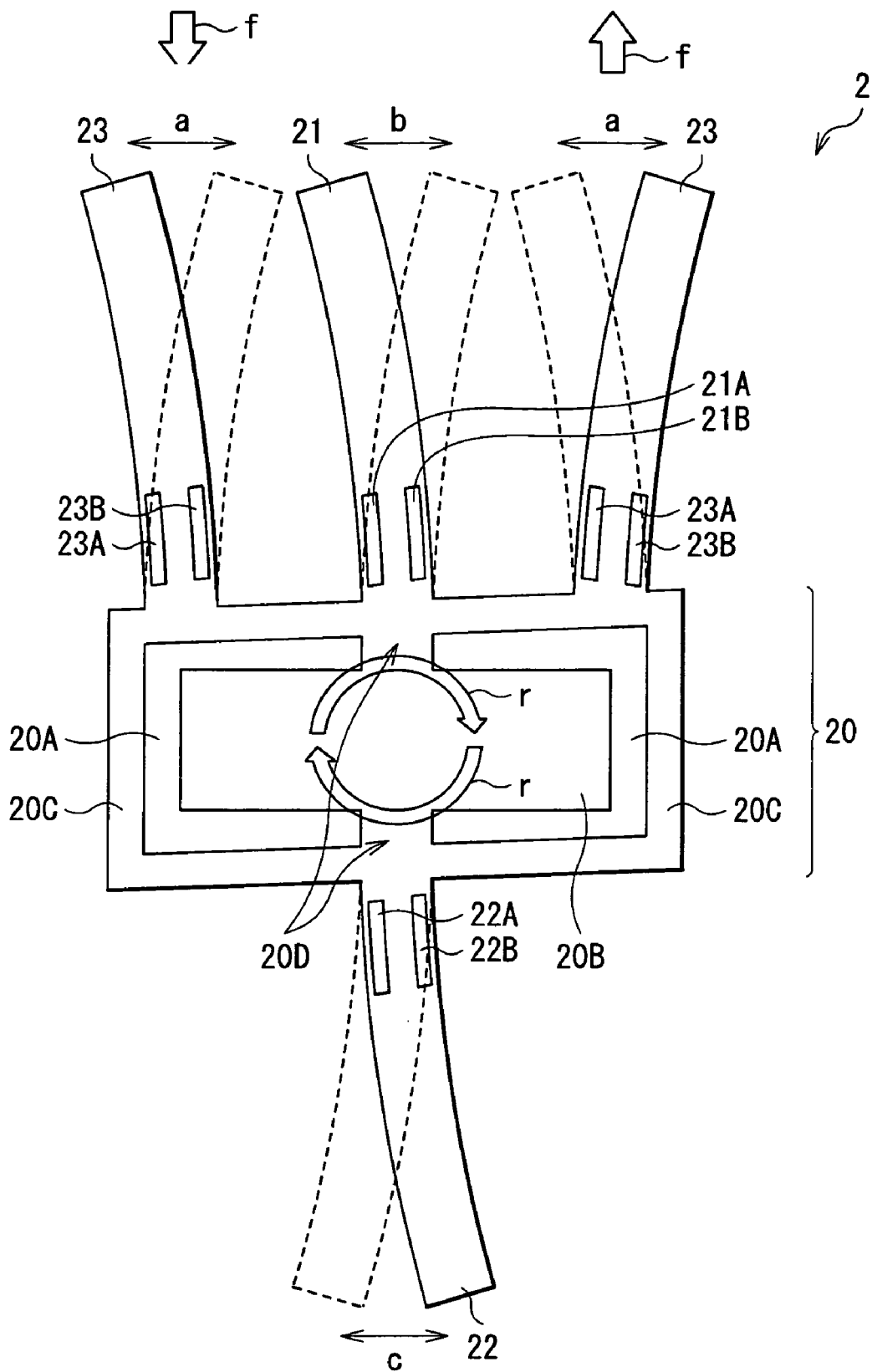
FIG. 26 is a top surface block diagram for explaining an operation of the angular velocity sensor of FIG. 1 when rotational motion is applied thereto.

Then, in the chase the object equipped with the angular velocity sensing device 1 starts a rotation "r" about a rotation axis extending in a direction orthogonal to the top surface of the sensor element supporting portion 51 for example, the Coriolis force "f" acts on the pair of upper drive arm portions 23 in a direction opposite to each other, and each of the upper detection arm portion 21 and the lower detection arm portion 22 starts an asymmetrical right and left vibration motion in a direction "b" orthogonal to the extending direction of the upper detection arm portion 21 and in a direction "c" orthogonal the extending direction of the lower detection arm portion 22 respectively, as shown in FIG. 26. Accordingly, a detection signal can be obtained by the piezoelectric elements 21A and 21B in accordance with the vibration of the upper detection arm portion 21 while a detection signal can be obtained by the piezoelectric elements 22A and 22B in accordance with the vibration of the lower detection arm portion 22, thereby detecting an angular velocity.

By the way, in the present embodiment and its modifications, the fixed portion 20 includes one or more slits 20A extending at least in a direction orthogonal to the extending direction of the upper detection arm portion 21, and the upper detection arm portion 21 and the pair of upper drive arm portions 23 are arranged in parallel in the extending direction of the slits 20A on the fixed portion 20. Accordingly, a distortion generated by the Coriolis force applied to the pair of upper drive arm portions 23 can be easily transmitted to the upper detection arm portion 21 and the lower detection arm portion 22 via the fixed portion 20. In this manner, the fixed portion 20 can be readily fixed onto the support surface of the fixed portion 20 even without complicated structure.

Figure 27:
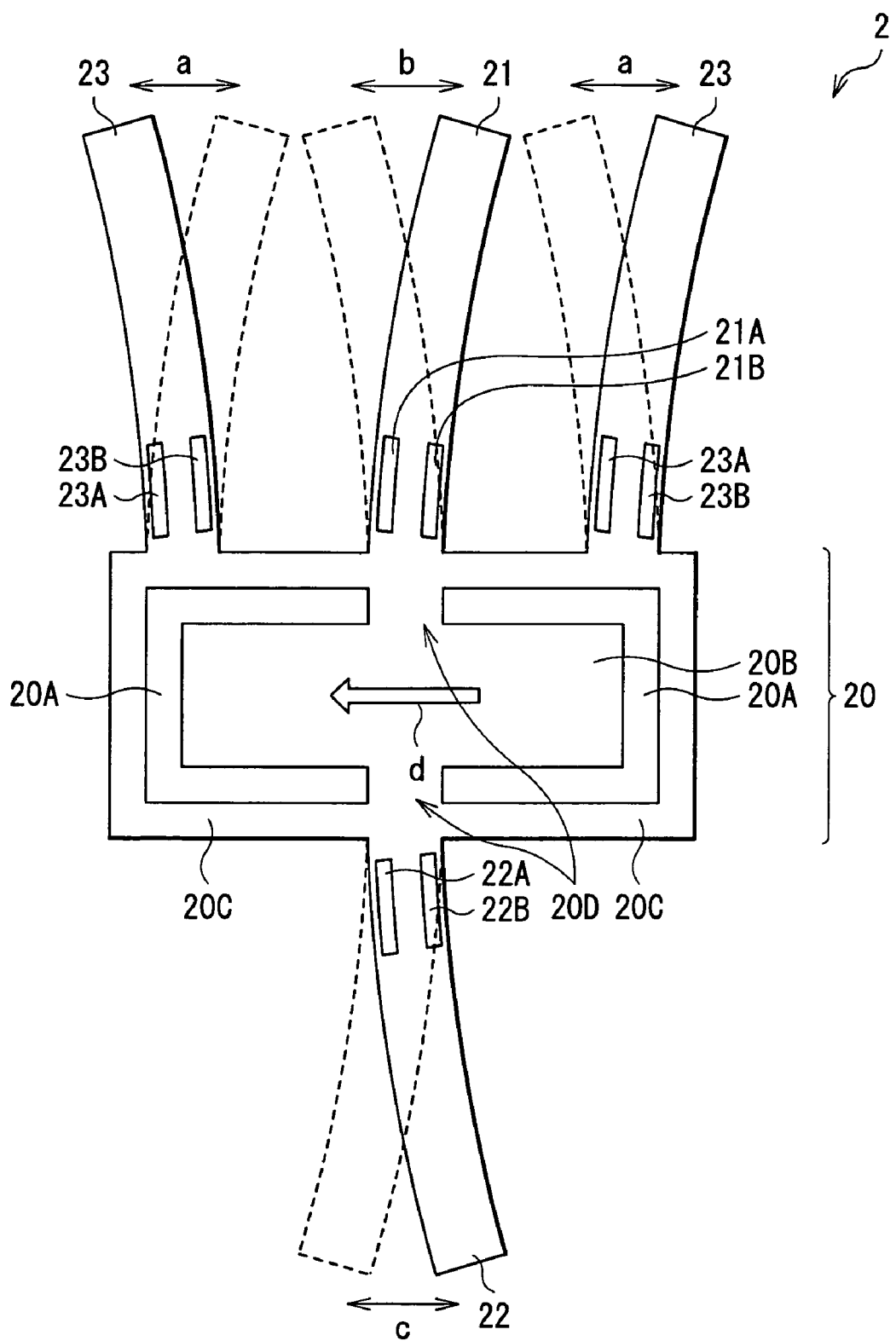
FIG. 27 is a top surface block diagram for explaining an operation of the angular velocity sensor of FIG. 1 when a translational acceleration from a lateral direction is applied thereto.

In addition, since the lower detection arm portion 22 extends from a side opposite to that of the upper detection arm portion 21 and the pair of upper drive arm portions 23 according to the present embodiment and its modifications, if a translational acceleration "d" is applied from a lateral direction as shown in FIG. 27 for example, when the angular velocity is detected as mentioned above, or when the object equipped with the angular velocity sensing device 1 is stopped or rotated at a constant speed, the upper detection arm portion 21 and the lower detection arm portion 22 are displaced in the same direction, thereby causing an in-phase vibration to both of them, in the direction "b" orthogonal to the extending direction of the upper detection arm portion 21 and in the direction "c" orthogonal to with the extending direction of the lower detection arm portion 22 respectively.

Accordingly, output of vibration caused by the translational acceleration can be cancelled out by determining a difference in detection signals between the piezoelectric elements 21A and 21B and the piezoelectric elements 22A and 22B, to reduce a noise generation. Thus, the present embodiment can, even as a horizontally located type, discriminate the Coriolis-based vibration from the vibration caused by the translational acceleration, thereby becoming scarcely affected by the translational acceleration.

Here, when the slits 20A are formed symmetrically with respect to the extending direction of the upper detection arm portion 21 (right-left symmetry), drive vibrations are easily generated on both sides symmetrically. As a result, the configuration of the drive circuit for driving the pair of upper drive arm portions 23 can be simplified and reduce the generation of unnecessary vibrations that would be generated in the upper detection arm portion 21 and the lower detection arm portion 22.

Figure 28:
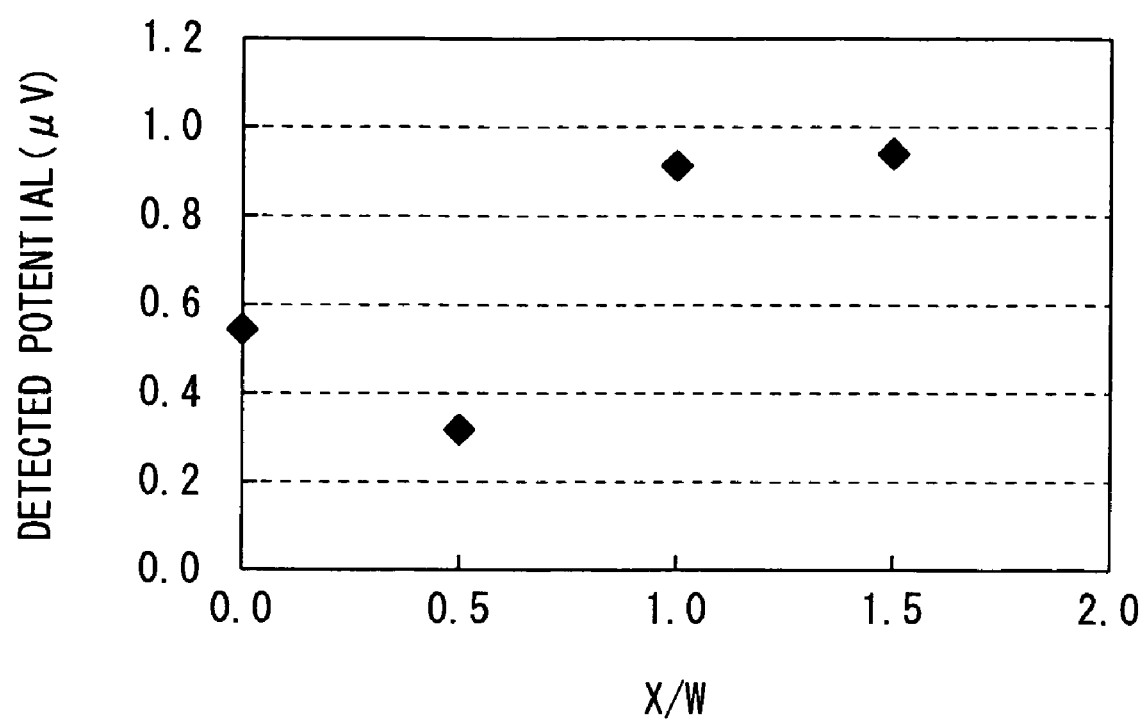
FIG. 28 is a graph showing the relationship between detected potential and quotient obtained from dividing the slit width by the width of the fixed portion.

When only one slit 20A, which is configured to right-left symmetrically extend, is formed in the fixed portion, it proves that when the quotient obtained from dividing the width "x" of the slit 20A by the width "W" of the fixed portion 20 (x/W) is 0.5 or more, for example, the detected voltage attains the maximum as shown in FIG. 28. Thus it is known that, when the width "x" of the slit 20A satisfies the above-mentioned relational expression (x/W≧0.5), the value of the detected voltage increases. As a result, angular velocity sensor characteristics such as sensitivity, detecting accuracy and resolution improve. FIG. 28 shows a result of detected voltage when the width W of the fixed portion 20 is 2.0 mm.

When the slits 20A are configured to include the center of gravity, or configured to surround the center of gravity, configured in the form of an L-shape or a U-shape, distortion generated by the Coriolis force applied to the pair of upper drive arm portions 23 can be transmitted more easily via the fixed portion 20 to the upper detection arm portion 21 and the lower detection arm portion 22.

When the slits A are configured to pass through the fixed portion A, the fixed portion 20 is more easily distorted and deformed. Thus distortion generated by the Coriolis force can be transmitted more efficiently to the first upper vibration arm 21 and the first lower vibration arm 22.

When the connection points for connecting the fixed portion to each of the upper detection arm portion 21 and the pair of upper drive arm portions 23 are linearly arranged, the upper detection arm portion 21 and the pair of upper drive arm portions 23 can be configured almost in the same form. Thus adjustment of frequency becomes simplified. Further, configuration processing at the time of manufacture becomes more simple and dispersion in the configuration of each angular velocity sensor 2 can be suppressed. Thus components of uniform characteristics are easily available.

In addition, when the upper detection arm portion 21, the pair of upper drive arm portions 23 and the lower detection arm portion 22 are configured to extend in directions parallel to each other, the greatest moment is obtainable from the Coriolis force thereby further improving the detecting accuracy.

When the pair of upper drive arm portions 23 are formed symmetrically with respect to the upper detection arm portion 21, drive vibrations are easily generated on both sides symmetrically. As a result, the configuration of the drive circuit for driving the pair of upper drive arm portions 23 can be simplified and reduce the generation of unnecessary vibrations that would be generated in the upper detection arm portion 21 and the lower detection arm portion 22.

In addition, when the upper detection arm portion 21 and the lower detection arm portion 22 are formed symmetrically with respect to a symmetry axis passing through the fixed portion 20 and extending in a direction orthogonal to the extending direction of the upper detection arm portion 21, the vibration caused by the translational acceleration can be easily discriminated from the angular velocity-based vibration, thus detecting accuracy of the angular velocity is improved.

To easily remove the translational acceleration, the upper detection arm portion 21 and the lower detection arm portion 22 should preferably have the same amplitude and resonance frequency as each other. In this manner, vibrations excited by the translational acceleration applied from the lateral direction are canceled more efficiently, thus noise can be reduced more easily. In order to easily remove the translational acceleration, it is also preferred that the upper drive arm portions 23 have the same amplitude and resonance frequency with each other.

Figure 29:
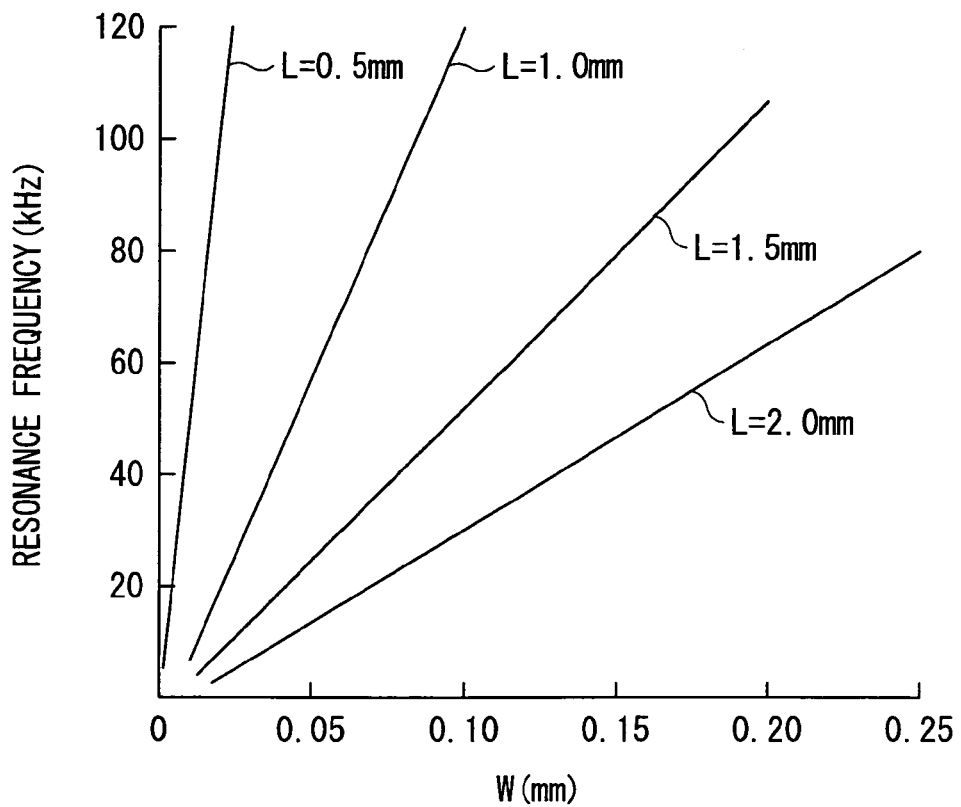
FIG. 29 is a graph showing the relationship between resonance frequency and width of vibration arms.
Figure 30:
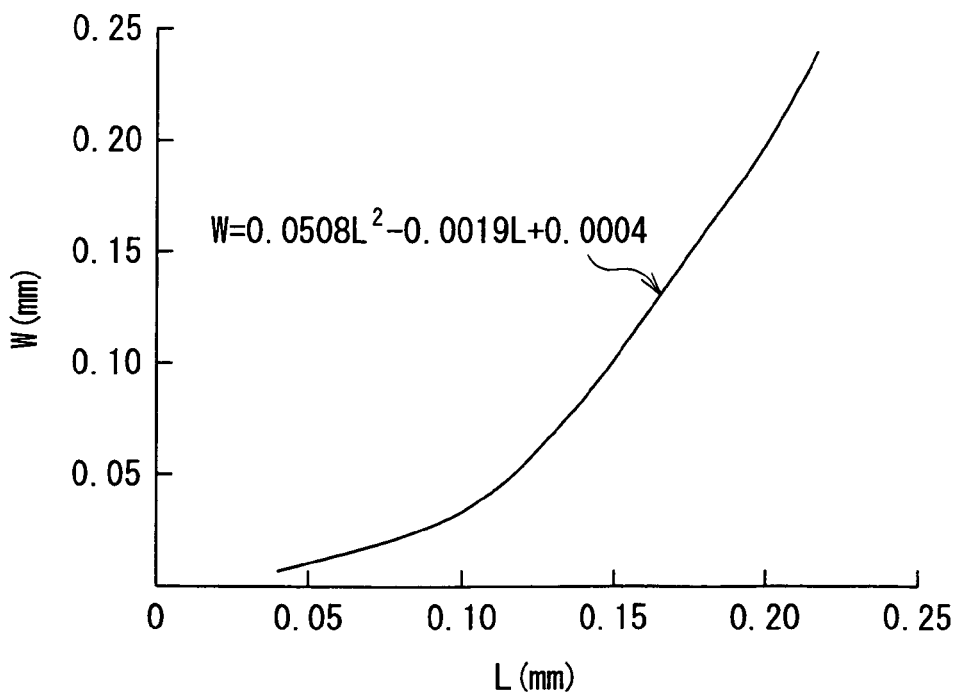
FIG. 30 is graph showing the relationship between width and length of the vibration arms.

Specifically, as shown in FIG. 29, the resonance frequency and the amplitude are adjustable by changing the width W of the vibrating portions (a width W1 of the upper detection arm portion 21, a width W2 of the lower detection arm portion 22, a width W3 of one of the pair of upper drive arm portions 23, and a width W4 of the other of the pair of upper drive arm portions 23 as shown in FIG. 3), or by changing the length L (a length L1 of the upper detection arm portion 21, a length L2 of the lower detection arm portion 22, a length L3 of one of the pair of upper drive arm portions 23, and a length L4 of the other of the pair of upper drive arm portions 23 as shown in FIG. 3). Thus it is desirable that the amplitudes and resonance frequencies should be the same between the upper detection arm portion 21 and the lower detection arm portion 22, or between the pair of upper drive arm portions 23. That will be attainable by, for example, adjusting the relationship between the width W and the length L in such a manner as shown in FIG. 30. Most preferably, the upper detection arm portion 21 and the lower detection arm portion 22 are configured symmetrically with respect to the fixed portion 20, and the pair of upper drive arm portions 23 are configured symmetrically with respect to the upper detection arm portion 21. Such symmetrical configuration allows them to have the same vibrations with each other, thereby the noise can be reduced to the lowest level.

In addition, the fixed portion 20 of the present embodiment and its modifications has only four vibration arms (namely, the upper detection arm portion 21, the lower detection arm portion 22 and the pair of upper drive arm portions 23), which can reduce the number of the vibration arms by two compared with those having a configuration of up-down symmetry as disclosed in Japanese Patent No. 3694160 or in Japanese Laid-Open Patent Publication No. 2005-106481, thereby improving the yields throughout the manufacturing process.

In addition, according to the present embodiment and its modifications, since only the lower detection arm portion 22 is connected to the fixed portion 20 on a side thereof opposite to the upper detection arm portion 21 and the pair of upper drive arm portions 23 and the angular velocity sensor 2 is not up-down symmetric in configuration, it is not always necessary to seek for the up-down symmetry as disclosed in Japanese Patent No. 3694160 or Japanese Laid-Open Patent Publication No. 2005-106481, etc. Accordingly, the upper detection arm portion 21 and the lower detection arm portion 22 do not have to be configured in the same form and size, thus more compact-sized angular velocity sensor 2 is available just by reducing the length of the lower detection arm portion 22.

Second Embodiment

Next, an angular velocity sensing device 7 of a second embodiment of the present invention will be described.

Figure 31:
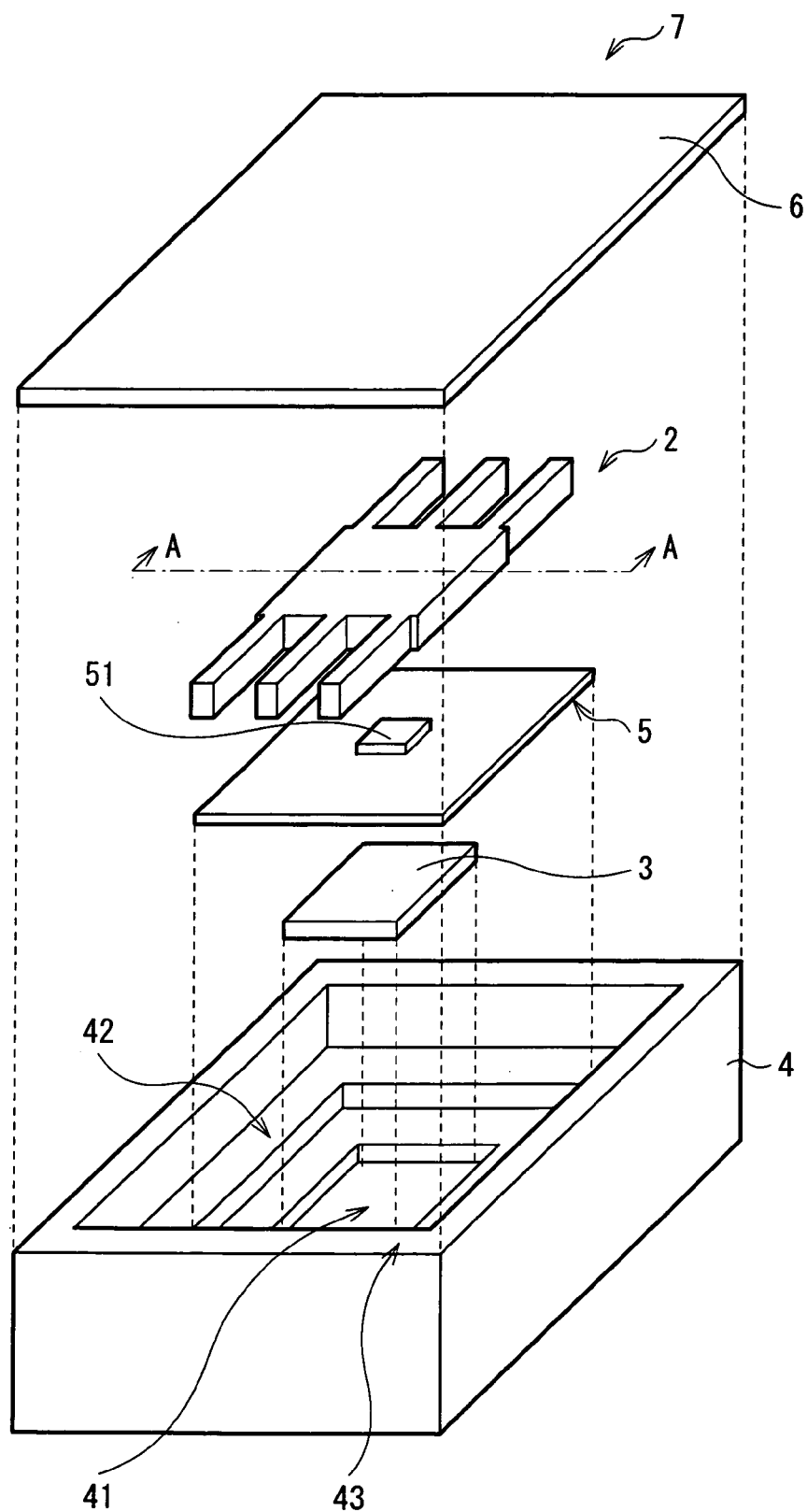
FIG. 31 is a perspective view showing a disassembled internal configuration of an angular velocity sensing device according to a second embodiment of the present invention.
Figure 32:
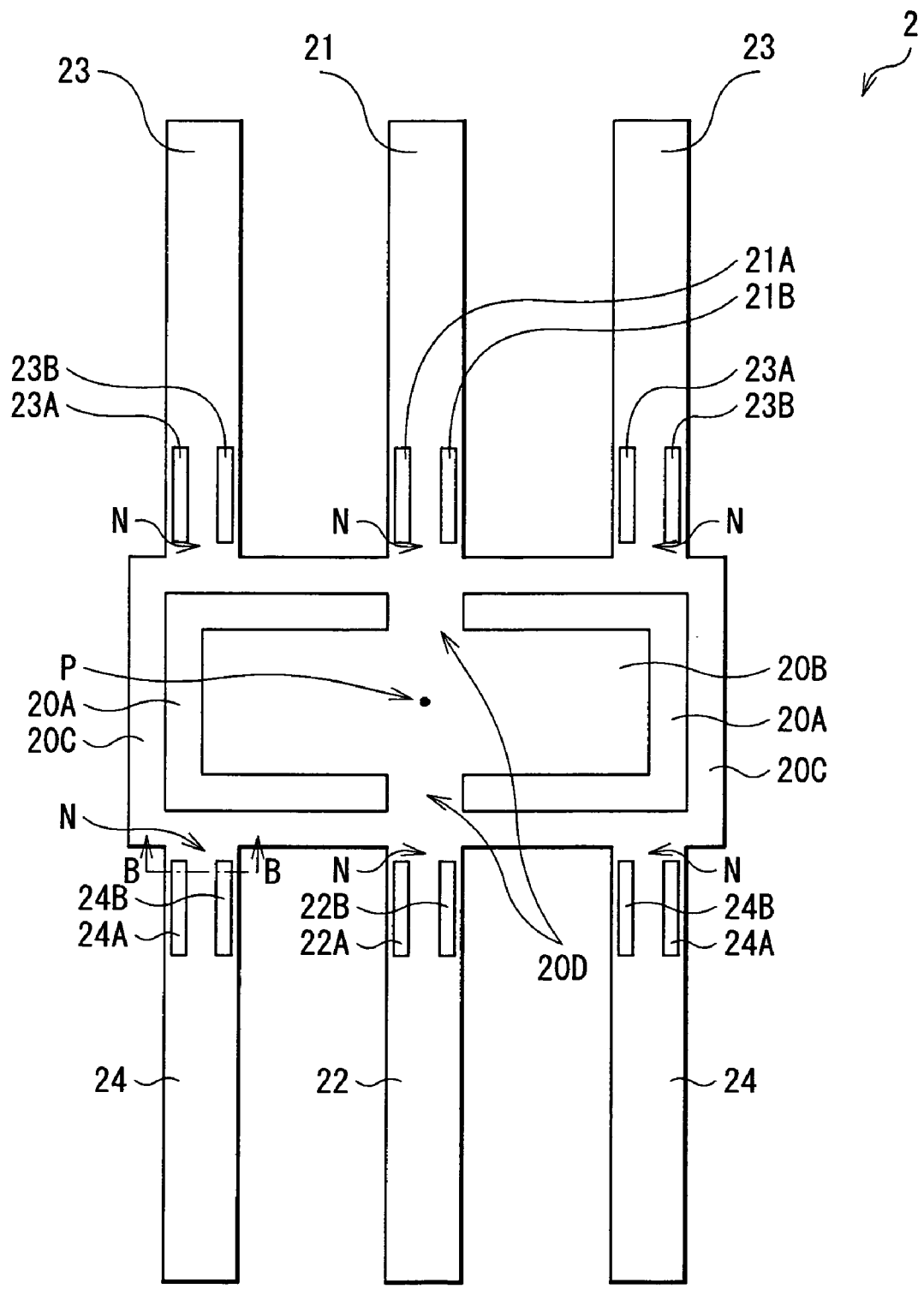
FIG. 32 is a top surface block diagram of an angular velocity sensor of FIG. 31.

In the above-mentioned embodiment and its modifications, the pair of upper drive arm portions 23 are directly connected to the fixed portion 20 in such a manner as to form a pair of arms with the upper detection arm portion 21 in between. On the other hand, in the present embodiment, not only the pair of drive arm portions 23 but a pair of lower drive arm portions 24 (second and third lower vibration arms) are also directly connected to the fixed portion 20 in such a manner as to form a pair of arms with the lower detection arm portion 22 in between, as shown in FIGS. 31 and 32.

Figure 33:
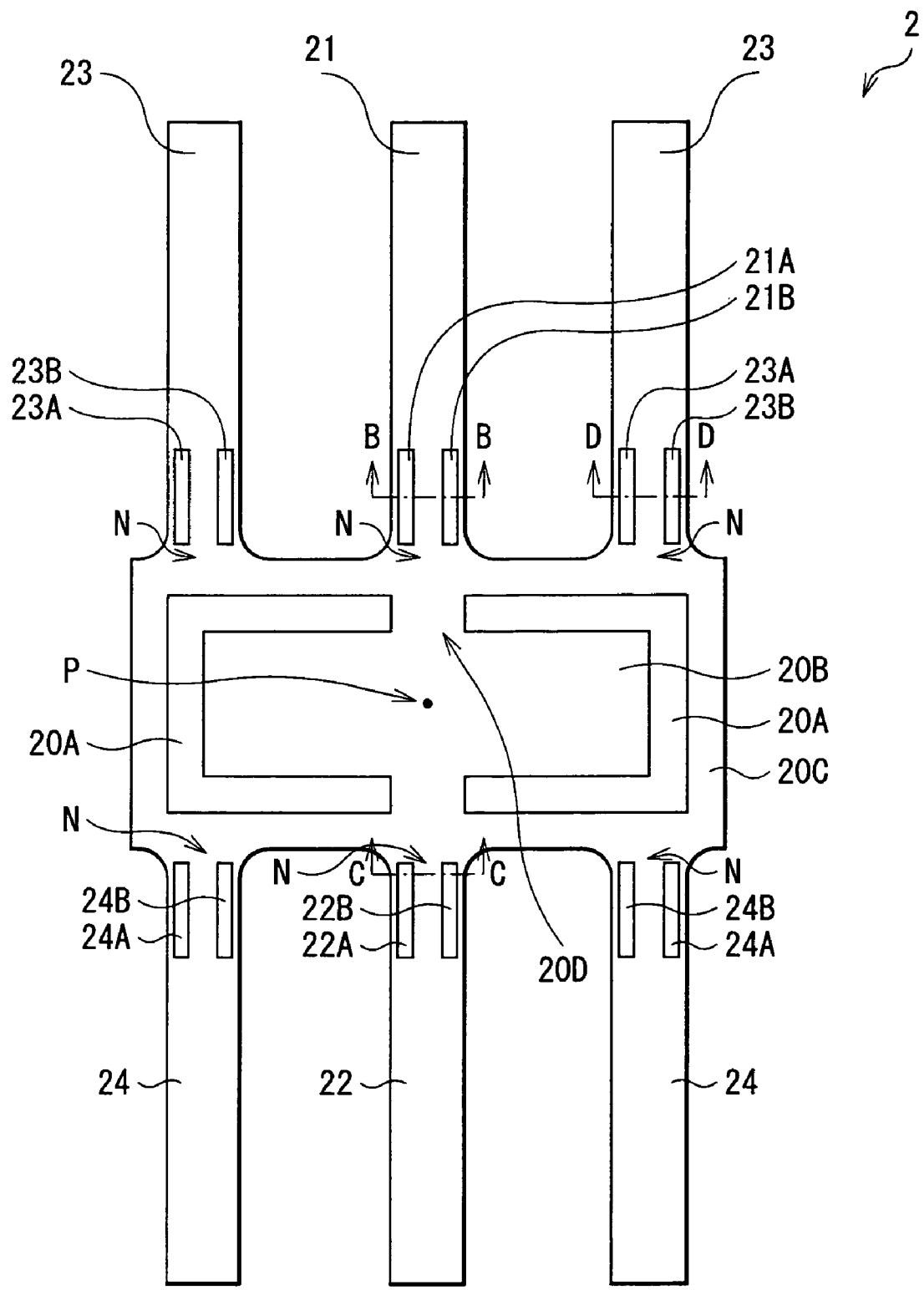
FIG. 33 is a top surface block diagram of an angular velocity sensor according to one modification of FIG. 31.

The lower drive arm portions 24 generate the Coriolis force thereon when an object, which is equipped with the angular velocity sensing device 7 thereupon, rotates with respect to a rotation axis extending in a direction orthogonal to a plane including the top surface of the sensor element supporting portion 51 (namely, a direction vertical to the face of the paper of FIG. 3). The lower drive arm portions 24 are connected to the fixed portion 20 on the same side where the lower detection arm portion 22 are connected (one side of the outer edge portion 20C in FIG. 32), and extending away from the fixed portion 20 along a plane parallel to the top surface of the sensor element supporting portion 51. That is, connection points N, each of which connects the fixed portion 20 to each of the lower detection arm portion 22 and the pair of lower drive arm portions 24, are linearly arranged in the right-left direction. It is to be noted that, even when the connection points N respectively include a flare portion as shown in FIG. 33, it can be said that they are linearly arranged in the right-left direction.

Each of the lower drive arm portions 24 is disposed separately from the lower detection arm portion 22 with an appropriate distance to avoid collision with each other when they are all vibrating simultaneously. It is preferred that the lower drive arm portions 24 extend in directions parallel to each other, but they may extend in mutually-intersecting directions with a given angle. It is also preferred that the lower drive arm portions 24 are formed symmetrically with respect to the lower detection arm portion 22 (right-left symmetry), but they may not be necessarily configured in such a manner. It is also preferred that the upper detection arm portion 21, the pair of upper drive arm portions 23, the lower detection arm portion 22 and the pair of lower drive arm portions 24 extend in directions parallel to each other, they may extend in mutually intersecting directions with a given angle.

Herein, the lower drive arm portions 24 are typically formed of a material same as that of the upper drive arm portions 23 and so on (such as silicon for example), and can be produced in bulk formation by patterning a wafer.

Figure 34:
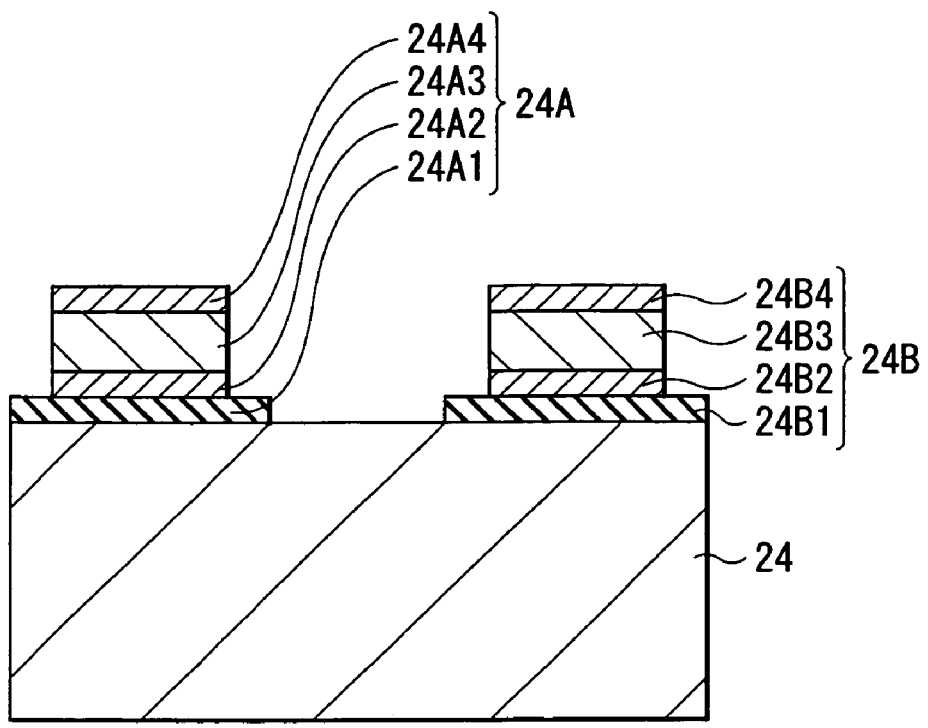
FIG. 34 is a cross sectional view showing a configuration taken along line B-B of the angular velocity sensor of FIG. 32, as seen from the direction indicated by the arrows.

A pair of piezoelectric elements 24A and 24B are formed upon the face of each of the lower drive arm portions 24 in such a manner as to extend in a direction parallel to each of the extending direction of the lower drive arm portions 24, as shown in FIG. 34. The pair of piezoelectric elements 24A and 24B serve to vibrate the respective lower drive arm portions 24 along a plane parallel to the top surface of the sensor element supporting portion 51 of the casing 4, and preferably are arranged side by side in a width direction of the lower drive arm portions 24.

Here, each of the piezoelectric elements 24A is typically formed by layering an insulating layer 24A1, a lower electrode 24A2, a piezoelectric crystal 24A3, and an upper electrode 24A4 in this order on each of the lower drive arm portions 24, as shown in FIG. 34. On the other hand, each of the piezoelectric elements 24B is typically formed by layering an insulating layer 24B1, a lower electrode 24B2, a piezoelectric crystal 24B3, and an upper electrode 24B4 in this order on each of the lower drive arm portions 24, as shown in FIG. 34. That is, the piezoelectric element 24A and the piezoelectric element 24B are formed independently of each other.

Figure 35:
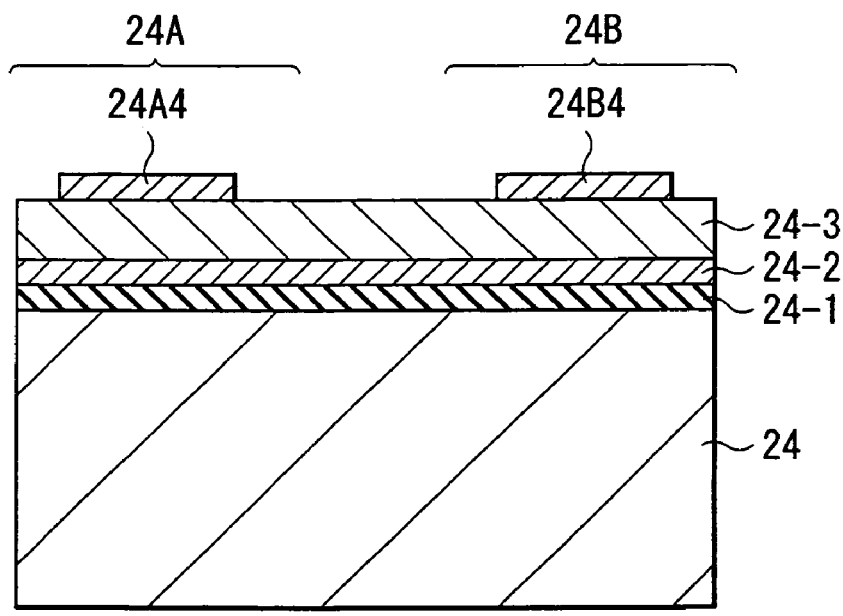
FIG. 35 is a cross sectional view of an angular velocity sensor according to one modification of FIG. 34.

As shown in FIG. 35, it is also possible that the insulating layers 24A1 and 24B1 are formed from a common insulating layer 24-1, for example. Similarly, the lower electrodes 24A2 and 24B2 may be formed from a common lower electrode 24-2, and the piezoelectric crystals 24A3 and 24B3 may be formed from a common piezoelectric crystal 24-3, for example.

Herein, the insulating layers 24A1, 24B1 and 24-1 are formed by layering a $ZrO_2$ film and an $Y_2O_3$ film in order, for example. The lower electrodes 24A2, 24B2, and 24-2 are typically made of a Pt (100) orientation film. The piezoelectric crystals 24A3, 24B3, and 24-3 are typically formed including the lead zirconate titanate (PZT). The upper electrode 24A4 and 24B4 are typically made of the Pt (100) orientation film.

Figure 36:
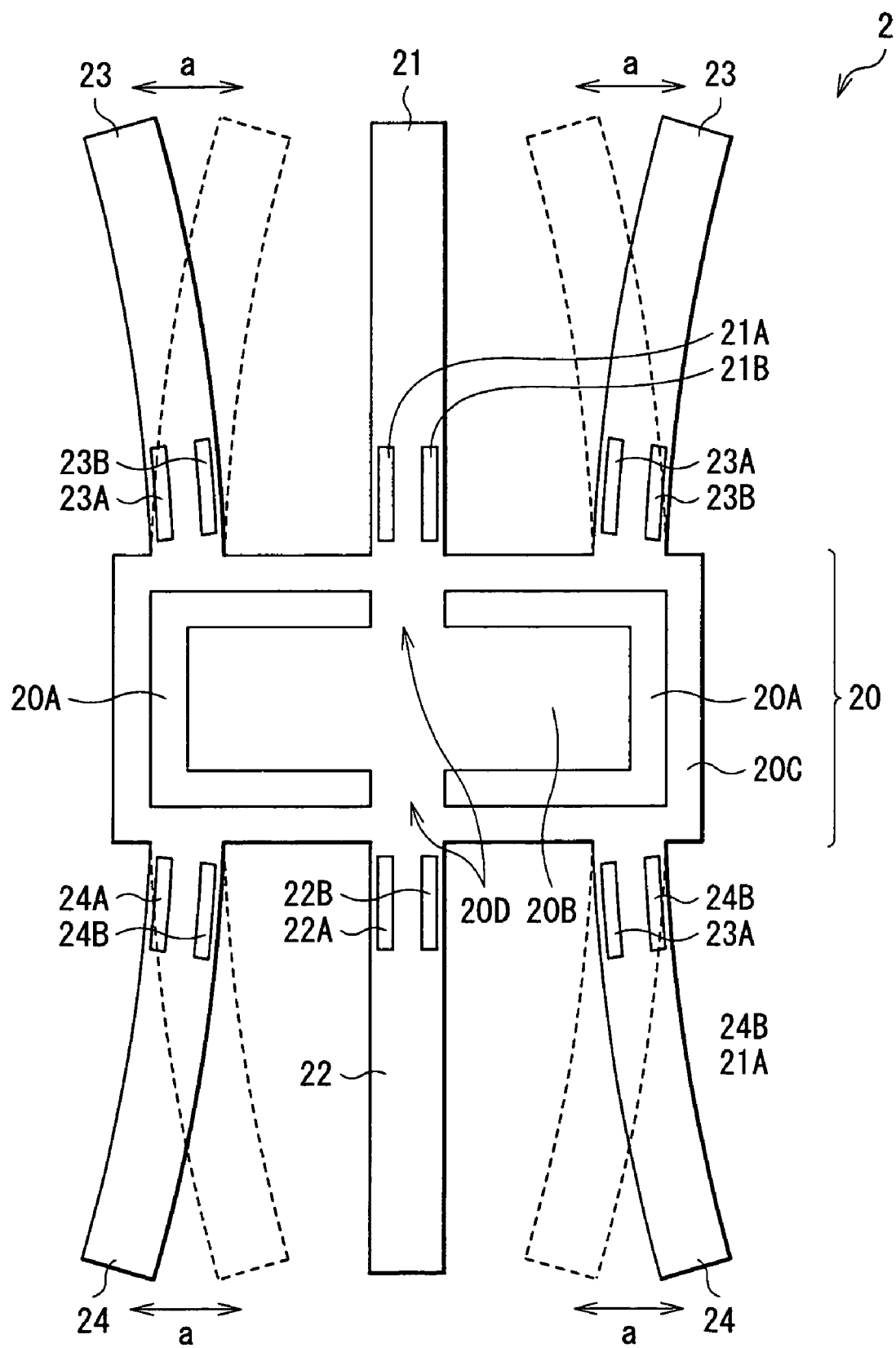
FIG. 36 is a top surface block diagram for explaining an operation of the angular velocity sensor of FIG. 31 when rotational motion is not applied thereto.

In the angular velocity sensing device 7 with such arrangement, if the pair of upper drive arm portions 23 and the pair of lower drive arm portions 24 are driven using the piezoelectric elements 23A, 23B, 24A and 24B for example when an object equipped with the angular velocity sensing device 7 is not rotated, the pair of upper drive arm portions 23 and the pair of lower drive arm portions 24 mostly vibrate in a direction "a" orthogonal to the extending direction of the upper drive arm portions 23 and the lower drive arm portions 24, as shown in FIG. 36.

Figure 37:
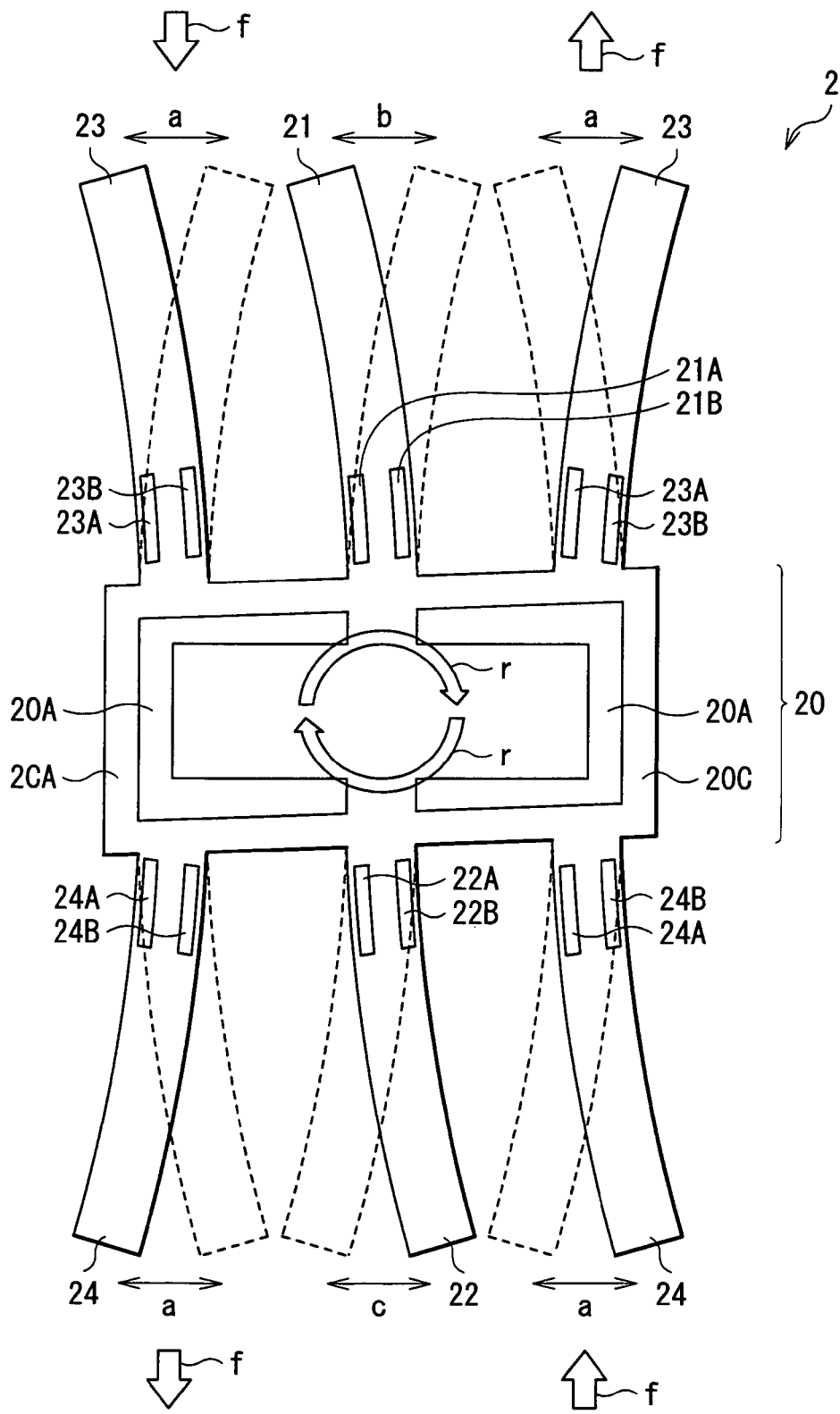
FIG. 37 is a top surface block diagram for explaining an operation of the angular velocity sensor of FIG. 36 when the rotational motion is applied thereto.

Then, when the object equipped with the angular velocity sensing device 7 starts a rotation "r" about a rotation axis extending in a direction orthogonal to the top surface of the sensor element supporting portion 51 for example, the Coriolis force "f" acts on the pair of upper drive arm portions 23 in directions opposite to each other, and also acts on the pair of lower drive arm portions 24 in directions opposite to each other, and the upper detection arm portion 21 and the lower detection arm portion 22 start an asymmetrical right and left vibration motion in a direction "b" orthogonal to the extending direction of the upper detection arm portion 21 and in a direction "c" orthogonal the extending direction of the lower detection arm portion 22 respectively, as shown in FIG. 37. Accordingly, a detection signal can be obtained by the piezoelectric elements 21A and 21B in accordance with the vibration of the upper detection arm portion 21 while a detection signal can be obtained by the piezoelectric elements 22A and 22B in accordance with the vibration of the lower detection arm portion 22, thereby detecting an angular velocity thereof.

By the way, according to the present embodiment, the generated Coriolis force can be applied as a greater moment to the pair of upper drive arm portions 23 and the pair of lower drive arm portions 24, thus comparatively increasing the amplitude of vibrations of both of the upper detection arm portion 21 and the lower detection arm portion 22. As a result, detecting accuracy of the angular velocity improve.

In the case of providing the pair of lower drive arm portions 24, when the slits 20A are formed symmetrically with respect to the upper detection arm portion 21 and also formed with respect to a symmetry axis passing through the center of the fixed portion 20 in a direction orthogonal to the extending direction of the upper detection arm portion 21, drive vibrations are easily generated on both sides symmetrically. As a result, the configuration of the drive circuit for driving the pair of upper drive arm portions 23 and the pair of lower drive arm portions 24 can be simplified and reduce the generation of unnecessary vibrations that would be generated in the pair of upper drive arm portions 23 and the pair of lower drive arm portions 24.

When the connection points N for connecting the fixed portion 20 to each of the lower detection arm portion 22 and the pair of lower drive arm portions 24 are linearly arranged, the lower detection arm portion 22 and the pair of lower drive arm portions 24 can be configured almost in the same form. Thus adjustment of frequency becomes easy. Further, configuration processing at the time of manufacture becomes simpler and dispersion in the configuration of each angular velocity sensor 2 can be suppressed. Thus components of uniform characteristics are easily available.

In addition, when the upper detection arm portion 21, the pair of upper drive arm portions 23, the lower detection arm portion 22 and the pair of lower drive arm portions 24 are configured to extend in directions parallel to each other, the greatest moment is obtainable from the Coriolis force. Thus detecting accuracy can be further improved.

In addition, when the upper detection arm portion 21 and the lower detection arm portion 22 are formed symmetrically with respect to a symmetry axis passing through the fixed portion 20 and extending in a direction orthogonal to the extending direction of the upper detection arm portion 21, and the pair of upper drive arm portions 23 and the pair of lower drive arm portions 24 are configured to extend symmetrically with respect to a symmetry axis passing through the fixed portion 20 and extending in a direction orthogonal to the upper detection arm portion 21, the vibration caused by the translational acceleration can be easily discriminated from the angular velocity-based vibration. Thus detecting accuracy of the angular velocity is improved.

Although the present invention has been described above with reference to the embodiments and modifications, the invention is not limited to the embodiments and so on but can be variously modified.

Obviously many modifications and variations of the present invention are possible in the light of the above teachings. It is therefore to be understood that within the scope of the appended claims the invention may be practiced otherwise than as specifically described.

What is claimed is:

1. An angular velocity sensor comprising:
a fixed portion fixed to a support surface,
a detection arm portion connected to the fixed portion and extending along a plane parallel to the support surface, and
a drive arm portion connected to the fixed portion and extending along the plane parallel to the support surface,
wherein the fixed portion includes two slits or trenches extending at least in a direction intersecting with an extending direction of the detection arm portion,
the detection arm portion includes a first upper vibration arm and a first lower vibration arm respectively connected to the fixed portion on sides opposite to each other,
the drive arm portion includes a second upper vibration arm and a third upper vibration arm connected to the fixed portion on one side in such a manner as to form a pair of arms, with the first upper vibration arm in between, and respectively extending along the plane parallel to the support surface in a same direction where the first upper vibration arm extends,
connection points, where the fixed portion is connected to each of the first to third upper vibration arms, are linearly arranged in a straight line on one side of the fixed portion,
each slit or trench is configured in the form of a consecutive U-shape and open sides of the U-shape are arranged toward a center of gravity of the angular velocity sensor, the two slits or trenches are arranged to face each other in the extending direction of the detection arm portion with the center of gravity in between and arranged symmetrically with respect to the detection arm portion, and
when a length of the slit in a direction orthogonal to the extended direction of the detection arm portion or the first vibration arm is defined as x and a length of the fixed portion in the direction orthogonal to the extended direction of the detection arm portion or the first vibration arm is defined as W, the x and the W satisfy a relational expression of $x/W > 0.5$.

2. The angular velocity sensor according to claim 1, wherein the slits or trenches are configured to pass through the fixed portion.

3. The angular velocity sensor according to claim 1, wherein the center of gravity of the angular velocity sensor is located in a region of the slits or trenches.

4. The angular velocity sensor according to claim 1, wherein a plurality of the slits are formed in the fixed portion to surround the center of gravity of the angular velocity sensor.

5. The angular velocity sensor according to claim 1, wherein the first to the third upper vibration arms and the first lower vibration arm are configured to extend in directions parallel to each other.

6. The angular velocity sensor according to claim 1, wherein the second upper vibration arm and the third upper vibration arm are formed symmetrically with respect to the first upper vibration arm.

7. The angular velocity sensor according to claim 1, wherein the angular velocity sensor includes:
a pair of first upper electrodes formed on the first upper vibration arm and arranged side by side along a width direction of the first upper vibration arm,
a pair of first lower electrodes formed on the first lower vibration arm and arranged side by side along the width direction of the first lower vibration arm,
a pair of second upper electrodes formed on the second upper vibration arm and arranged side by side along the width direction of the second upper vibration arm, and
a pair of third upper electrodes formed on the third upper vibration arm and arranged side by side along the width direction of the third upper vibration arm.

8. The angular velocity sensor according to claim 1, wherein the drive arm portion further includes a second lower vibration arm and a third lower vibration arm that are connected to the fixed portion on another side in such a manner as to form a pair of arms, with the first lower vibration arm in between, and respectively extending along the plane parallel to the support surface in the same direction where the first lower vibration arm extends.

9. The angular velocity sensor according to claim 8, wherein the slits are formed with respect to a symmetry axis passing through a center of the fixed portion in a direction orthogonal to the extending direction of the detection arm portion.

10. The angular velocity sensor according to claim 8, wherein connection points, where the fixed portion is connected to each of the first to third lower vibration arms, are linearly arranged.

11. The angular velocity sensor according to claim 8, wherein the first to third upper vibration arms, and the first to third lower vibration arms are configured to extend in directions parallel to each other.

12. The angular velocity sensor according to claim 8, wherein the second lower vibration arm and the third lower vibration arm are formed symmetrically with respect to the first lower vibration arm.

13. The angular velocity sensor according to claim 8, wherein
the first upper vibration arm and the first lower vibration arm are configured to extend symmetrically with respect to a symmetry axis passing through a center of the fixed portion in a direction orthogonal to extending direction of the detection arm portion, and
the second and third upper vibration arms and the second and third lower vibration arms are configured to extend symmetrically with respect to the symmetry axis, respectively.

14. The angular velocity sensor according to claim 8, wherein the angular velocity sensor includes:
a pair of first upper electrodes formed on the first upper vibration arm and arranged side by side along a width direction of the first upper vibration arm,
a pair of first lower electrodes formed on the first lower vibration arm and arranged side by side along the width direction of the first lower vibration arm,
a pair of second upper electrodes formed on the second upper vibration arm and arranged side by side along the width direction of the second upper vibration arm,
a pair of third upper electrodes formed on the third upper vibration arm and arranged side by side along the width direction of the third upper vibration arm,
a pair of second lower electrodes formed on the second lower vibration arm and arranged side by side along the width direction of the second lower vibration arm, and
a pair of third lower electrodes formed on the third lower vibration arm and arranged side by side along the width direction of the third lower vibration arm.

15. An angular velocity sensing device comprising an angular velocity sensor and an integrated circuit element,
the angular velocity sensor including:
a fixed portion fixed to a support surface,
a detection arm portion connected to the fixed portion and extending along a plane parallel to the support surface, and
a drive arm portion connected to the fixed portion and extending along the plane parallel to the support surface,
wherein the fixed portion includes two slits or trenches extending at least in a direction intersecting with an extending direction of the detection arm portion,
the detection arm portion includes a first upper vibration arm and a first lower vibration arm respectively connected to the fixed portion on sides opposite to each other,
the drive arm portion includes a second upper vibration arm and a third upper vibration arm connected to the fixed portion on one side in such a manner as to form a pair of arms, with the first upper vibration arm in between, and respectively extending along the plane parallel to the support surface in a same direction where the first upper vibration arm extends,
connection points, where the fixed portion is connected to each of the first to third upper vibration arms, are linearly arranged in a straight line on one side of the fixed portion,
each slit or trench is configured in the form of a consecutive U-shape and open sides of the U-shape are arranged toward a center of gravity of the angular velocity sensor,
the two slits or trenches are arranged to face each other in the extending direction of the detection arm portion with the center of gravity in between and arranged symmetrically with respect to the detection arm portion, and
when a length of the slit in a direction orthogonal to the extended direction of the detection arm portion or the first vibration arm is defined as x and a length of the fixed portion in the direction orthogonal to the extended direction of the detection arm portion or the first vibration arm is defined as W, the x and the W satisfy a relational expression of $x/W > 0.5$, and
the integrated circuit element transmits driving signals to the second and third upper vibration arms, and receives detection signals outputted from the first upper vibration arm and the first lower vibration arm.

16. The angular velocity sensing device according to claim 15, wherein
the drive arm portion further includes a second lower vibration arm and a third lower vibration arm connected to the fixed portion on another side in such a manner as to form a pair of arms, with the first lower vibration arm in between, and respectively extending along the plane parallel to the support surface in the same direction where the first lower vibration arm extends, and
the integrated circuit element transmits the driving signals to the second and third upper vibration arms and the second and third lower vibration arms, and receives the detection signals outputted from the first upper vibration arm and the first lower vibration arm.

17. The angular velocity sensor according to claim 1, wherein the fixed portion has a rectangular shape.

18. The angular velocity sensing device according to claim 15, wherein the fixed portion has a rectangular shape.

* * * * *